US007694015B2

(12) United States Patent
Yoshiuchi et al.

(10) Patent No.: US 7,694,015 B2
(45) Date of Patent: Apr. 6, 2010

(54) CONNECTION CONTROL SYSTEM, CONNECTION CONTROL EQUIPMENT AND CONNECTION MANAGEMENT EQUIPMENT

(75) Inventors: Hideya Yoshiuchi, Kokubunji (JP); Hidehiro Akiyama, Fujisawa (JP); Masahiro Yoshizawa, Kokubunji (JP); Yukiko Takeda, Tokorozawa (JP)

(73) Assignee: Hitachi, Ltd., Tokyo (JP)

( * ) Notice: Subject to any disclaimer, the term of this patent is extended or adjusted under 35 U.S.C. 154(b) by 1452 days.

(21) Appl. No.: 10/766,189

(22) Filed: Jan. 29, 2004

(65) Prior Publication Data

US 2005/0144289 A1 Jun. 30, 2005

(30) Foreign Application Priority Data

Dec. 3, 2003 (JP) .............................. 2003-403971

(51) Int. Cl.
*G06F 15/173* (2006.01)
(52) U.S. Cl. ...................... 709/244; 709/226; 709/228; 709/229; 709/230; 709/238; 709/242
(58) Field of Classification Search ....................... None
See application file for complete search history.

(56) References Cited

U.S. PATENT DOCUMENTS

| 5,546,390 | A | * | 8/1996 | Stone .......................... 370/408 |
| 6,449,272 | B1 | | 9/2002 | Chuah et al. |
| 6,725,264 | B1 | * | 4/2004 | Christy ...................... 709/225 |
| 6,829,232 | B1 | * | 12/2004 | Takeda et al. ................ 370/352 |
| 6,836,462 | B1 | * | 12/2004 | Albert et al. ................. 370/235 |
| 6,836,670 | B2 | * | 12/2004 | Castrogiovanni et al. .... 455/558 |
| 6,871,065 | B2 | * | 3/2005 | Yamaguchi ............... 455/414.1 |
| 6,982,978 | B1 | * | 1/2006 | Zhang et al. ................ 370/392 |
| 7,032,242 | B1 | * | 4/2006 | Grabelsky et al. ............. 726/11 |
| 7,113,994 | B1 | * | 9/2006 | Swift et al. .................. 709/229 |
| 7,222,188 | B1 | * | 5/2007 | Ames et al. .................. 709/238 |
| 7,346,697 | B2 | * | 3/2008 | Zhang et al. ................ 709/230 |

FOREIGN PATENT DOCUMENTS

| JP | 11-355272 | 5/1999 |
| JP | 2001-326697 | 5/2000 |
| JP | 2002-314587 | 4/2001 |
| JP | 2003-008607 | 6/2001 |

OTHER PUBLICATIONS

Japanese Office Action dated Jun. 24, 2008 regarding Japanese Patent Application No. 2003-403971, in Japanese.

* cited by examiner

*Primary Examiner*—Jeffrey Pwu
*Assistant Examiner*—Van Kim T Nguyen
(74) *Attorney, Agent, or Firm*—Stites & Harbison PLLC; Juan Carlos A. Marquez, Esq.

(57) ABSTRACT

With respect to a communication operation between networks having no connection permission, a connection control apparatus calculates a communicatable detour communication path from a connection policy database, and in such a case that a communication operation can be carried out between these networks having no connection permission, the connection control apparatus permits the communication operation via a detour communication path after authentication.

18 Claims, 29 Drawing Sheets

CONNECTION CONTROL SYSTEM, CONNECTION CONTROL EQUIPMENT AND CONNECTION MANAGEMENT EQUIPMENT

BACKGROUND OF THE INVENTION

The present invention is related to a connection control system which is connected via a communication network to a plurality of communication terminals, and related to a connection control apparatus and a connection management apparatus, which constitute this connection control system, and also related to an operating program of this connection management apparatus.

While communication networks are being expanded and are being applied to business fields, technical ideas capable of restricting connections have been developed in order to protect secret information such as enterprise confidential matters. VPN (Virtual Private Network) is known as a typical connection restricting technique. This VPN contains various technical realizing systems such as MPLS (Multi Protocol Label Switching), IPSec (IP (Internet Protocol) SECurity protocol), and L2TP (Layer 2 Tunneling Protocol). A basic operation of this VPN technique is carried out as follows: That is, while a connection restriction is provided in communication networks, a communication is permitted only to such communication networks, the connections of which are permitted. A connection permission is given in such a manner that when a system is constructed, a corresponding relationship between a connection source network and a connection destination network, whose connections are permitted, is registered in a connection policy database. In the most case, in order to obtain connection permission, such a condition cannot sufficiently satisfy this permission requirement, under which a connection source terminal merely belongs to a connection source network and also a connection destination terminal merely belongs to a connection destination network. In order to obtain such a connection permission, authentication process operations such as user authentication and terminal authentication are required.

For instance, Japanese Laid-open Patent Application No. JP-A-2003-8607 describes the collective managing method for managing the remote VPN bridged over the plural ISPs (Internet Service Providers). Also in this collective managing method, the authentication process operation is necessarily required.

SUMMARY OF THE INVENTION

However, the connection control method of the above-described patent publication owns such a problem that no communication can be established in the case that a connection source terminal belongs to a network to which connection permission is not given, for instance, in such a case that an ISP of a connection source and an ISP of a connection destination do not permit a mutual connection between terminals of the connection source and destination. In particular, another problem occurs. That is, as to such a terminal as a mobile terminal which is frequently moved between different networks, when the own network to which the terminal presently belongs is changed into another network, there is a certain possibility that this terminal cannot be communicated with a target terminal.

An object of the present invention is to realize a communication between terminals to which connection permission is not given by performing the following connection control method. That is, in a network in which a connection restriction has been established, when a communication connection from a connection source terminal to a connection destination terminal cannot be made due to such a reason that since either the connection source terminal or the connection destination terminal is moved, such an address is allocated to the connection source terminal by which this connection source terminal can be communicated with the communication destination terminal.

A connection control system, according to an aspect of the present invention, is featured by employing a connection control apparatus and an authentication apparatus. The connection control apparatus controls a communication established between either networks or terminals, and executes a connection permission judgement. The authentication apparatus authenticates a user who issues a connection request. In such a case that a connection request is reached from such a terminal which belongs to a network having no connection permission, the connection control system notifies such a message that the connection cannot be made with respect to this terminal. Furthermore, in such a case that a terminal requests the connection control system to retrieve a communication path capable of establishing a communication and also requests the connection control system to allocate an address which is used in this communication, the connection control system retrieves a detour communication path within a network which is managed by the own connection control system. Next, after the terminal which has issued the connection request is authenticated, the connection control system allocates both a network having a connection permission and an address by which the terminal can be connected to the network with respect to the authenticated terminal, so that the above-described problem can be solved.

In accordance with the connection control system of the present invention, in the communications between the not-connectable terminals, the detour path is set by coupling the networks having the connection permissions to each other, and the authentication is obtained, so that the communications can be established between the networks having no connection permission. Since such a connection control process operation is carried out, the communication utilization established between the mobile terminals can be improved, while the mobile terminals are frequently moved among the networks.

Other objects, features and advantages of the invention will become apparent from the following description of the embodiments of the invention taken in conjunction with the accompanying drawings.

BRIEF DESCRIPTION OF THE DRAWINGS

FIG. 19 is a diagram for illustratively indicating a packet format of a connection requirement and the like.

FIG. 20 is a diagram for illustratively showing a connection refuse notification and the like.

FIG. 21 is a diagram for illustratively indicating a packet format of a detour authentication success notification and the like.

FIG. 22 is a diagram for illustratively showing a detour authentication failure notification and the like.

FIG. 24 is a block diagram for schematically showing a hardware construction of the connection control apparatus and the like.

DESCRIPTION OF THE EMBODIMENT

Figure 1:
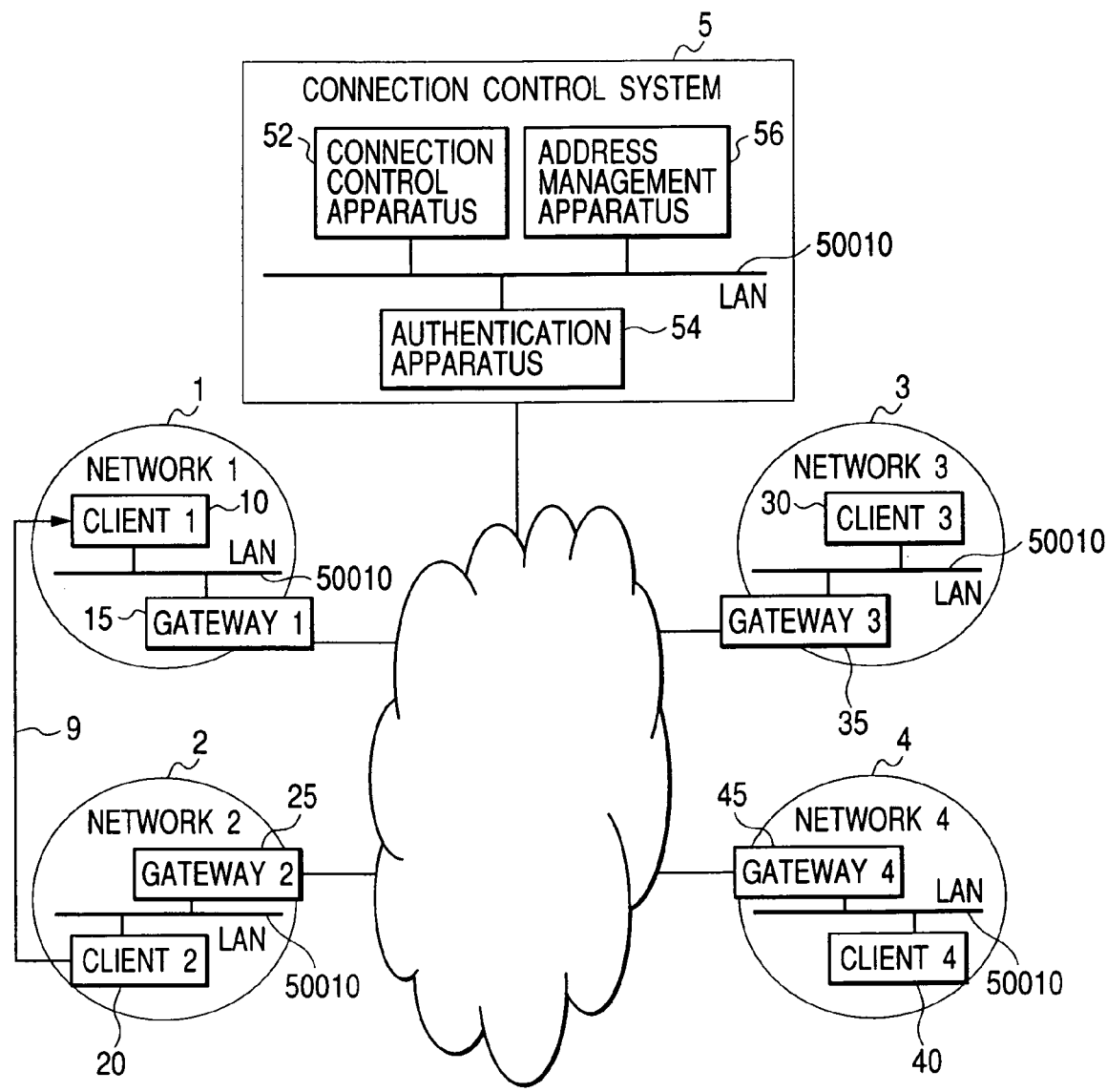
FIG. 1 is a schematic diagram for illustratively showing an entire arrangement of a connection control system according to an embodiment of the present invention.

An arrangement of a connection control system according to an embodiment of the present invention is indicated in FIG. 1. In the connection control system, a client-1 10 belonging to a network-1 1, a client-2 20 belonging to a network-2 2, a client-3 30 belonging to a network-3 3, and also, a client-4 40 belonging to a network-4 4 are connected via a LAN 50010 to a gateway-1 15, a gateway-2 25, a gateway-3 35, and also, a gateway-4 45 respectively, and are connected via these gateways to a connection control apparatus 52. The connection control system 5 is equipped with a communication control apparatus 52, an authentication apparatus 54, and an address management apparatus 56. The connection control apparatus 52 controls communications between clients. The authentication apparatus 54 executes authentication of a user. The address management apparatus 56 produces a connection address which is required when a detour connection is performed. In this case, a communication from the network-1 1 to the network-3 3 is not permitted. However, a communication from the network-1 1 to the network-2 2 is allowed, and a communication from the network-2 2 to the network-3 3 is permitted.

Figure 2:
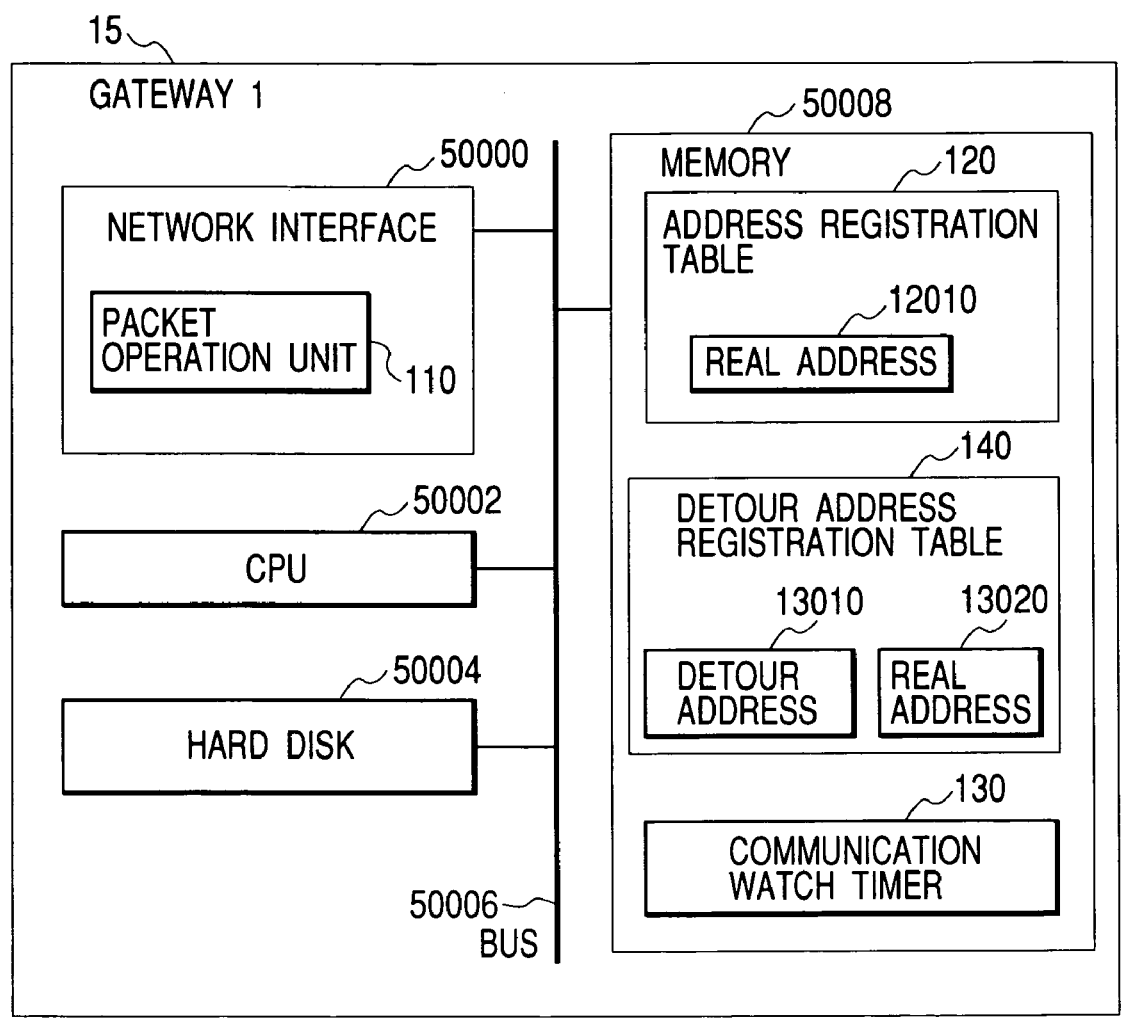
FIG. 2 is a functional block diagram for representing an internal arrangement of a gateway employed in the connection control system of FIG. 1.

Next, there are shown functional blocks as to respective elements which constitute the connection control system 5. FIG. 2 is a schematic block diagram of the gateway-1 15. In order that the connection control apparatus 52 controls connections of clients, also other gateway-2 through gateway-4 25, 35, 45 shown in FIG. 1, which are connected to the connection control apparatus 52, own similar internal arrangements to that of the above-described gateway-1 15.

The gateway-1 15 performs a communication operation via a network interface 50000 to an external unit. The gateway-1 15 is further provided with a CPU 50002, a hard disk 50004, and a memory 50008. These structural elements transmit/receive data via a bus 50006 to each other. In these hardware structures, a packet operation unit 110 (i.e., a transmission/reception unit) for receiving a packet from a client and for transmitting the received packet to a destination address is provided in the network interface 50000 of the gateway-1 15. Also, an address registration table 120, a detour address registration table 130, and a communication watch timer 140 are provided on a memory 50008 in the gateway-1 15. The address registration table 120 registers therein a real address 12010 of a client whose connection is permitted. The detour address registration table 130 registers thereinto a set of a real address 13020 and a detour address 13010, which as used when a detour connection is made. The communication watch timer watches a communication state.

A real address corresponds to such an address which has been allocated to a network interface of a client. In the case that a communication between an originating client (connection source terminal) and a destination client (connection destination terminal) is permitted, a communication is established by using this real address. A detour connection implies that a connection between clients is controlled by employing a communication path via a network to which connection permission has been given as a detour path in such a case that a communication between an originating client and a destination client cannot be established. A detour address corresponds to such an address which is allocated by the address management apparatus 56 in the case that a communication is made in a detour connection.

Figure 3:
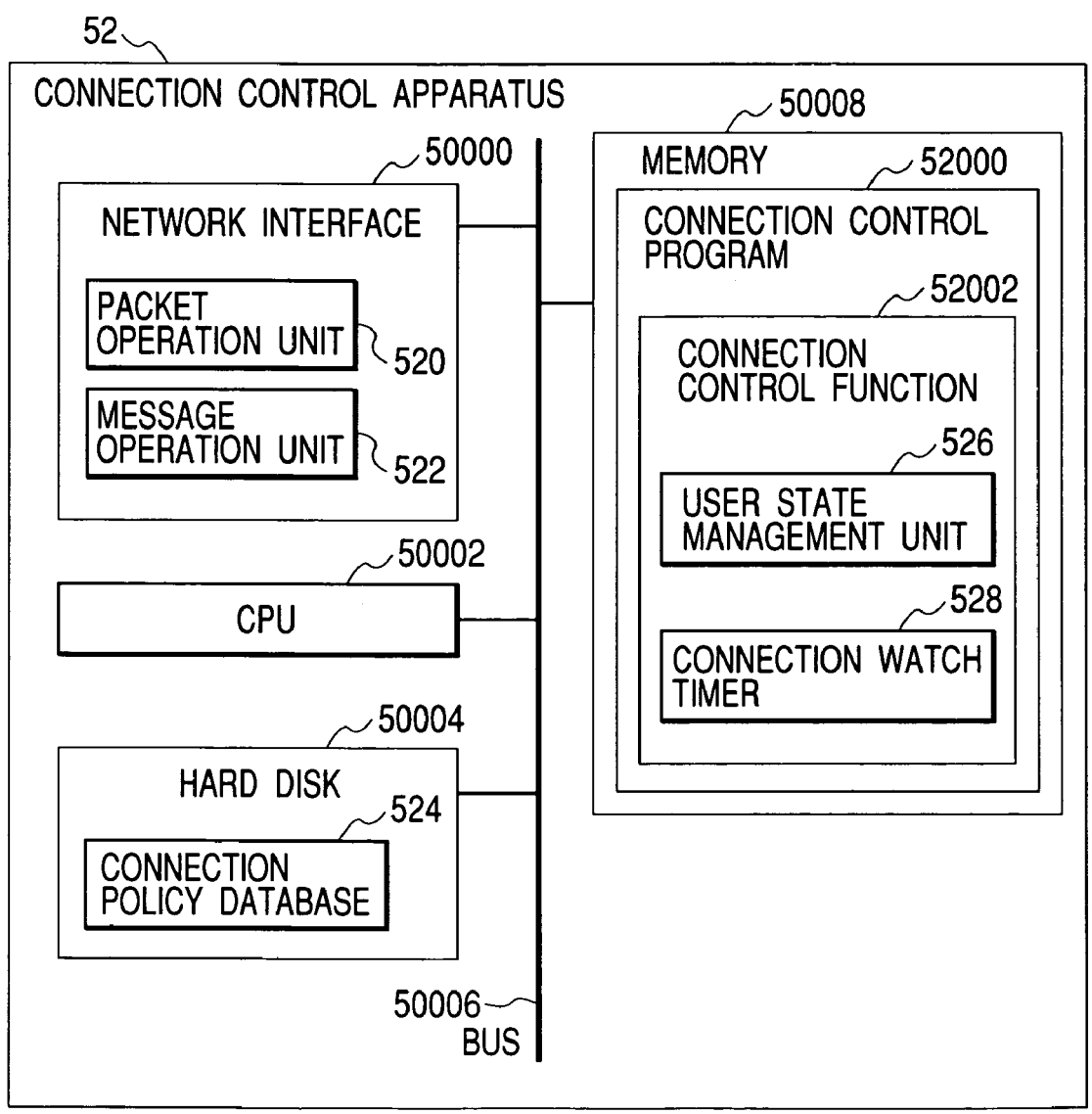
FIG. 3 is a function block diagram for indicating an internal arrangement of a connection control apparatus employed in the connection control system.

FIG. 3 is an internal arrangement of the connection control apparatus 52. The connection control apparatus 52 employs as a basic hardware construction, the network interface 50000 used to be communicated with the external unit, the CPU 50002, the hard disk 50004, the bus 50006, and the memory 50008. Furthermore, in the connection control apparatus 52, both a packet operation unit 520 and a message operation unit 522 are provided in the network interface 50000; a connection policy database 524 is provided in the hard disk 50004; and both a user state management unit 526 and a communication watch timer 528 are provided as a portion of a connection control function 52002 of a connection control program

52000 operabled on the memory 50008. The packet operation unit 520 is employed so as to receive, or transmit a packet from, or to a client. The message operation unit 522 is employed in order to transmit such a message for requesting another apparatus employed in the connection control system 5 so as to execute a process operation, and also in order to receive a process result of another apparatus as a message. The connection policy database 524 contains such an information for judging connection permission based upon both an address of an originating client and an address of a destination client with respect to a connection requirement issued from a client. The user state management unit 526 manages a state of a user whose connection should be controlled. The communication watch timer 528 watches a communication state. In this case, a message indicates a packet which is exchanged among the respective apparatus within the connection control system.

Figure 4:
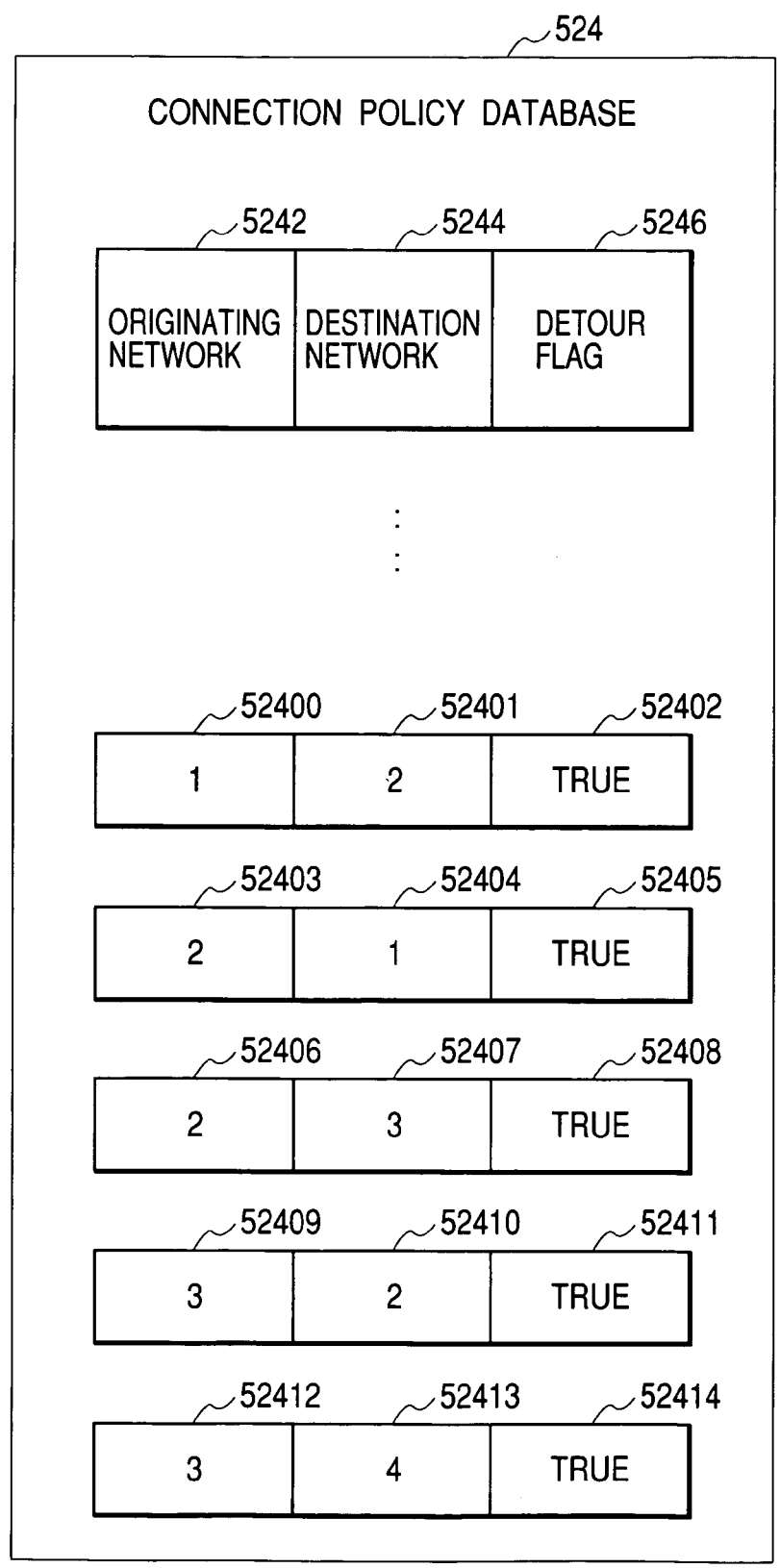
FIG. 4 is a functional block diagram for indicating a content of a connection policy database employed in the connection control apparatus of FIG. 3.

FIG. 4 indicates a detailed content of the connection policy database 524. The connection policy database 524 holds therein a relationship among networks, the connections of which are allowed, and contains an originating network 5242, a destination network 5244, and a detour flag 5246 which indicates as to whether or not a communication path can be used as a detour path. When the detour flag 5246 is a truth, this communication path can be used as the detour path.

Figure 5:
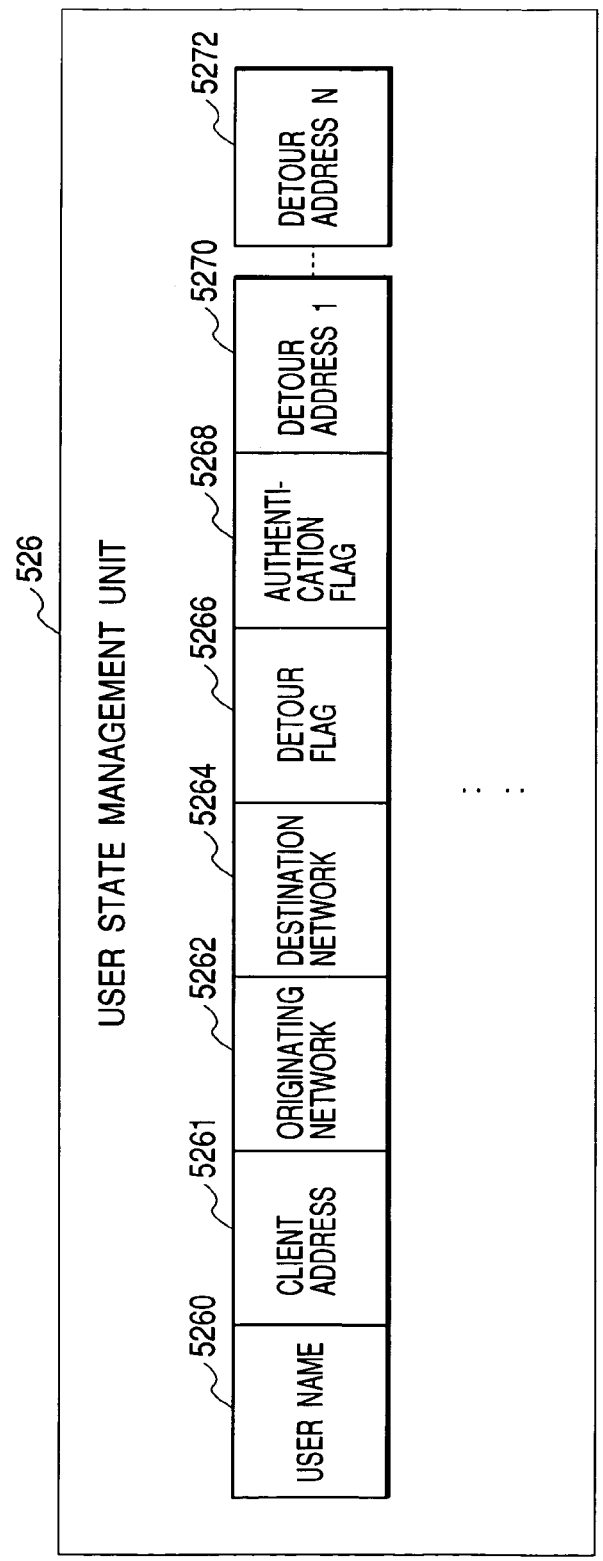
FIG. 5 is a functional block diagram for showing a content of a user state management unit employed in the connection control apparatus.

FIG. 5 shows a detailed content of the user state management unit 526. In FIG. 5, only one data record is exemplified. The user state management unit is a function block for managing a state of a user under control of connection. This user state management unit contains a user name 5260, a client address 5261, an originating network 5262, a destination network 5264, a detour flag 5266, an authentication flag 5268, a detour address-1 5270, and a detour address-N 5272. The detour flag 5266 becomes a truth in such a case that a subject user is using a detour path. The authentication flag 5268 becomes a truth in such a case that user authentication has been completed when a communication is established from an originating network to a destination network.

Figure 6:
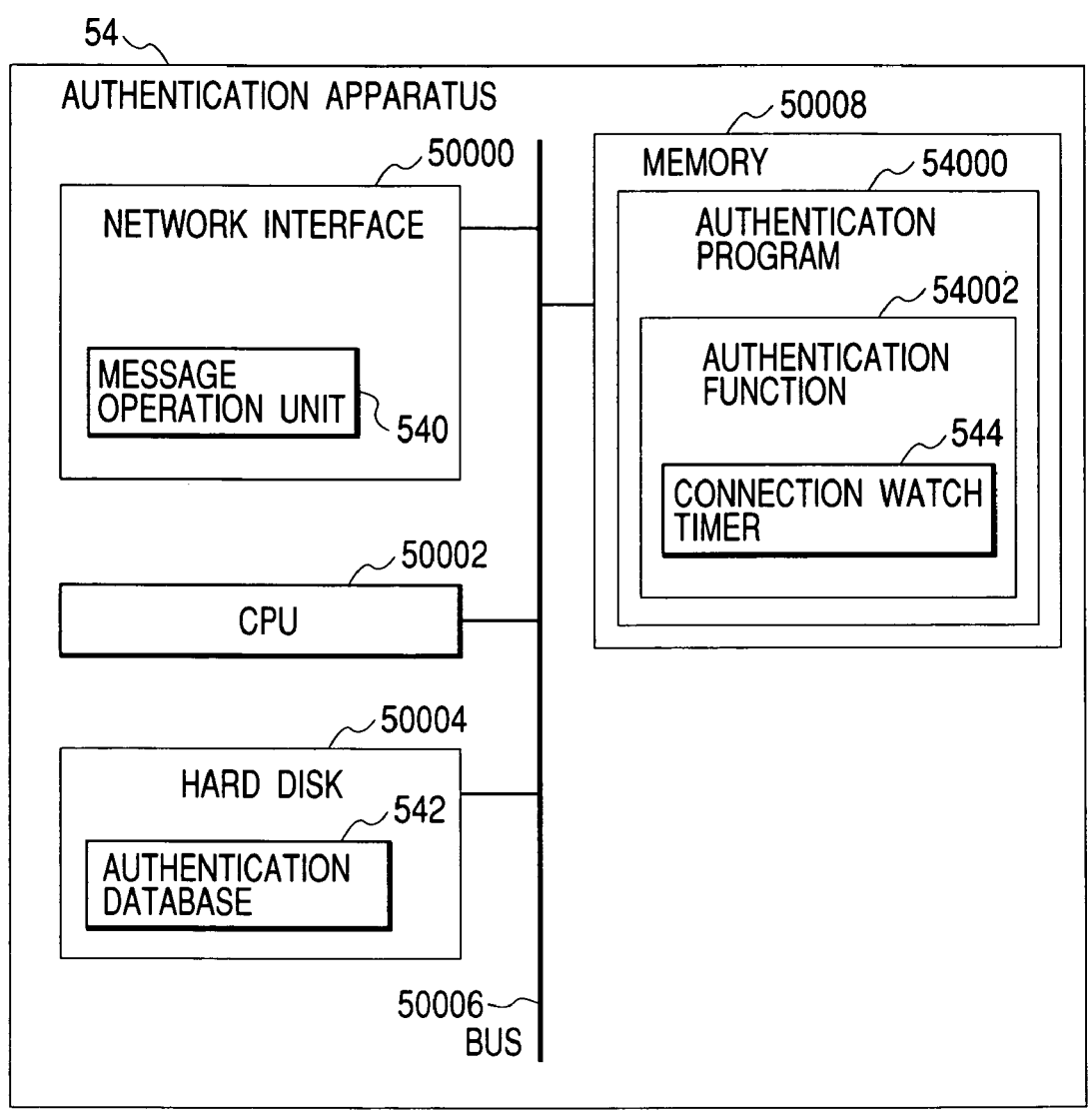
FIG. 6 is a functional block diagram for representing an authentication apparatus employed in the connection control system.

FIG. 6 indicates an internal arrangement of the authentication apparatus 54. The authentication apparatus 54 employs as a basic hardware structure, a network interface 50000 used to be communicated with an external unit, a CPU 50002, a hard disk 50004, a bus 50006, and a memory 50008. Furthermore, in the authentication apparatus 54, a message operation unit 540 is provided in the network interface 50000; an authentication database 542 is provided on the hard disk 50004; and a communication watch timer 544 is provided as a portion of an authentication function 54002 of an authentication program 54000 operable on the memory 50008.

Figure 7:
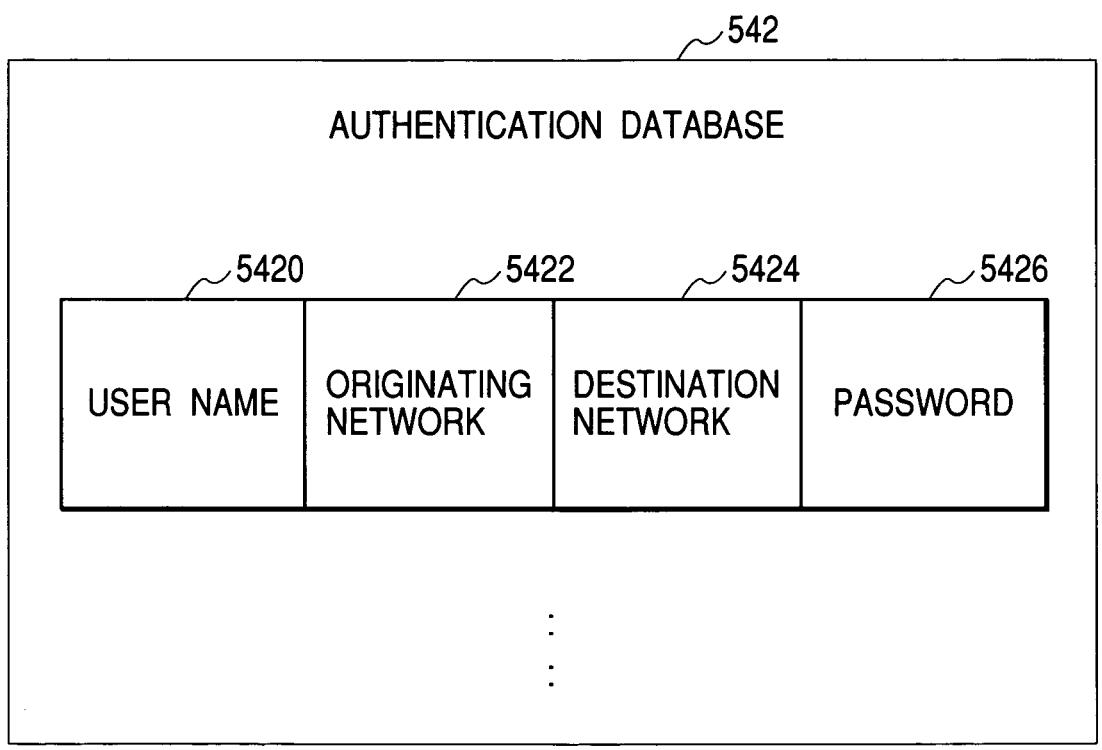
FIG. 7 is a functional block diagram for representing a content of an authentication database employed in the authentication apparatus of FIG. 6.

FIG. 7 is a detailed content of the authentication database 542. In FIG. 7, only one data record is exemplified. In the case that a detour connection is made, a communication operation is carried out via a plurality of communication paths. In this communication, authentication is carried out with respect to each of the communication paths. The authentication database 542 contains a user name 5420 to be authenticated, an originating network 5422, a destination network 5424, and a password 5426.

Figure 8:
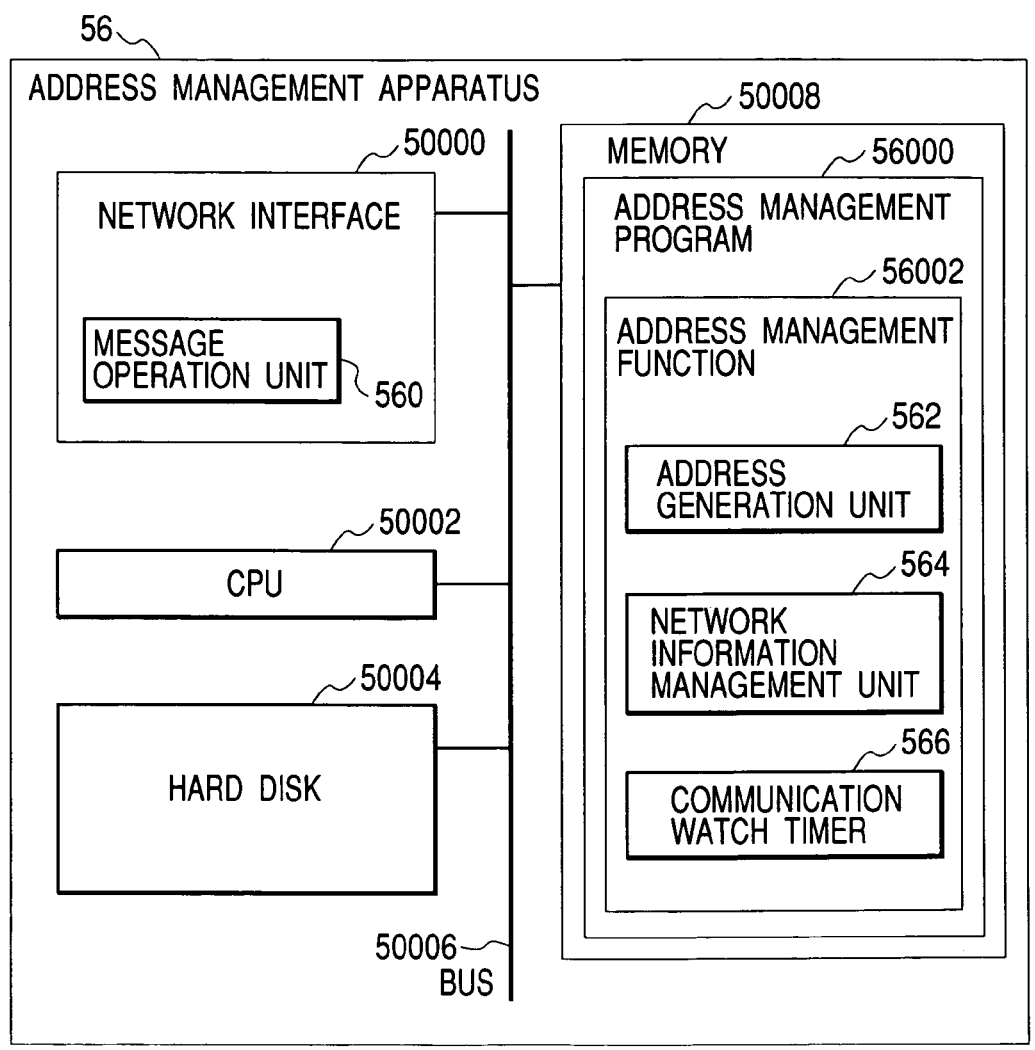
FIG. 8 is a functional block diagram for indicating an internal arrangement of an address management apparatus employed in the connection control system.

FIG. 8 is an internal arrangement of the address management apparatus 56. The address management apparatus 56 employs as a basic hardware structure, a network interface 50000 used to be communicated with an external unit, a CPU 50002, a hard disk 50004, a bus 50006, and a memory 50008. Furthermore, in the address management apparatus 56, a message operation unit 560 is provided in the network interface 50000. Also, an address generation unit/apparatus 562, a network information management unit 564, and a communication watch timer 566 are provided as a portion of a connection control function 56002 of an address management program 56000 operable on the memory 50008. The address generation unit 562 generates an address which is used in a detour connection. The network information management unit 564 manages information required when an address is generated. The communication watch timer 566 watches a communication state.

Figure 9:
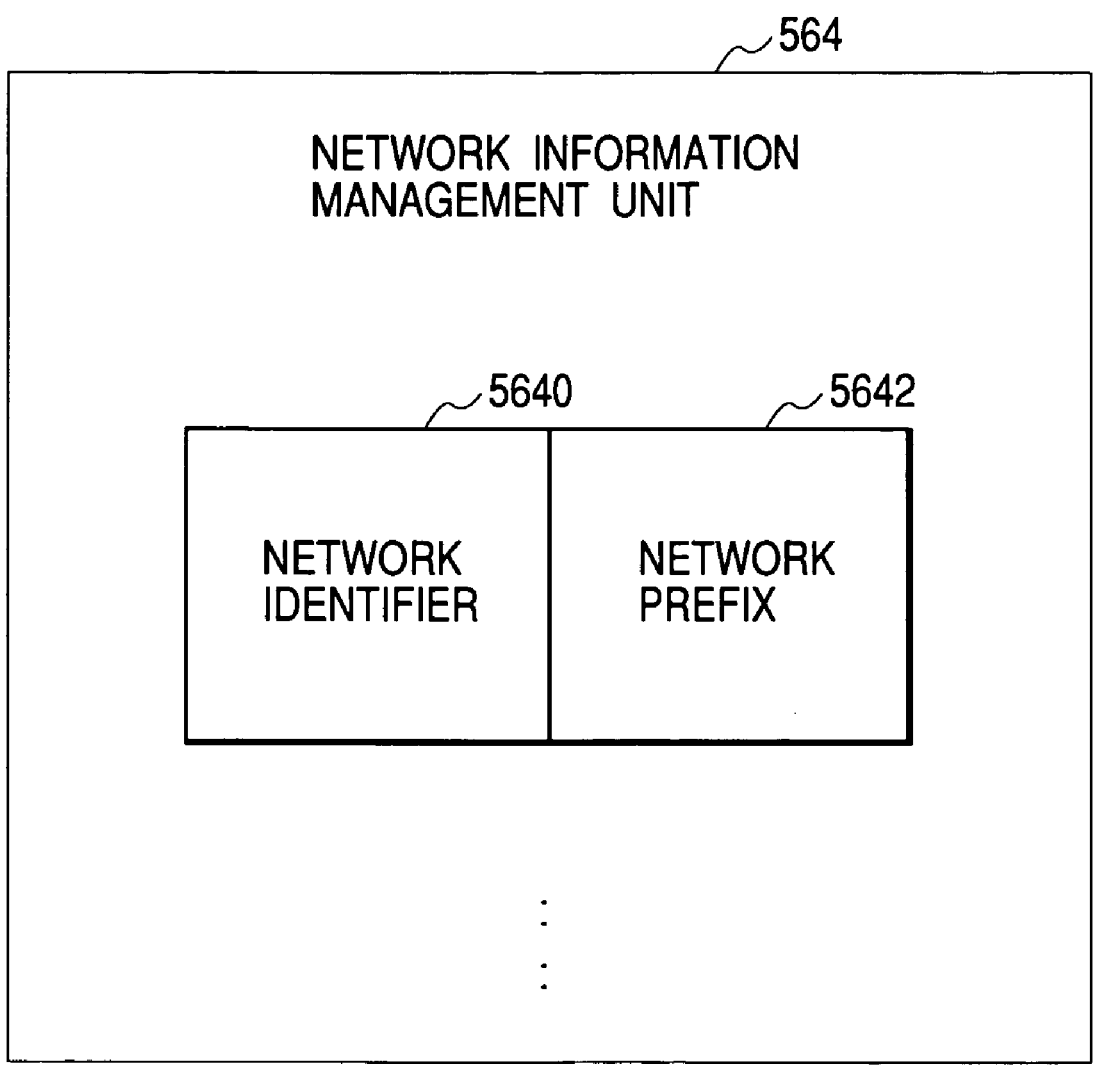
FIG. 9 is a functional block diagram for indicating a content of a network information management unit employed in the address management apparatus of FIG. 8.
Figure 10:
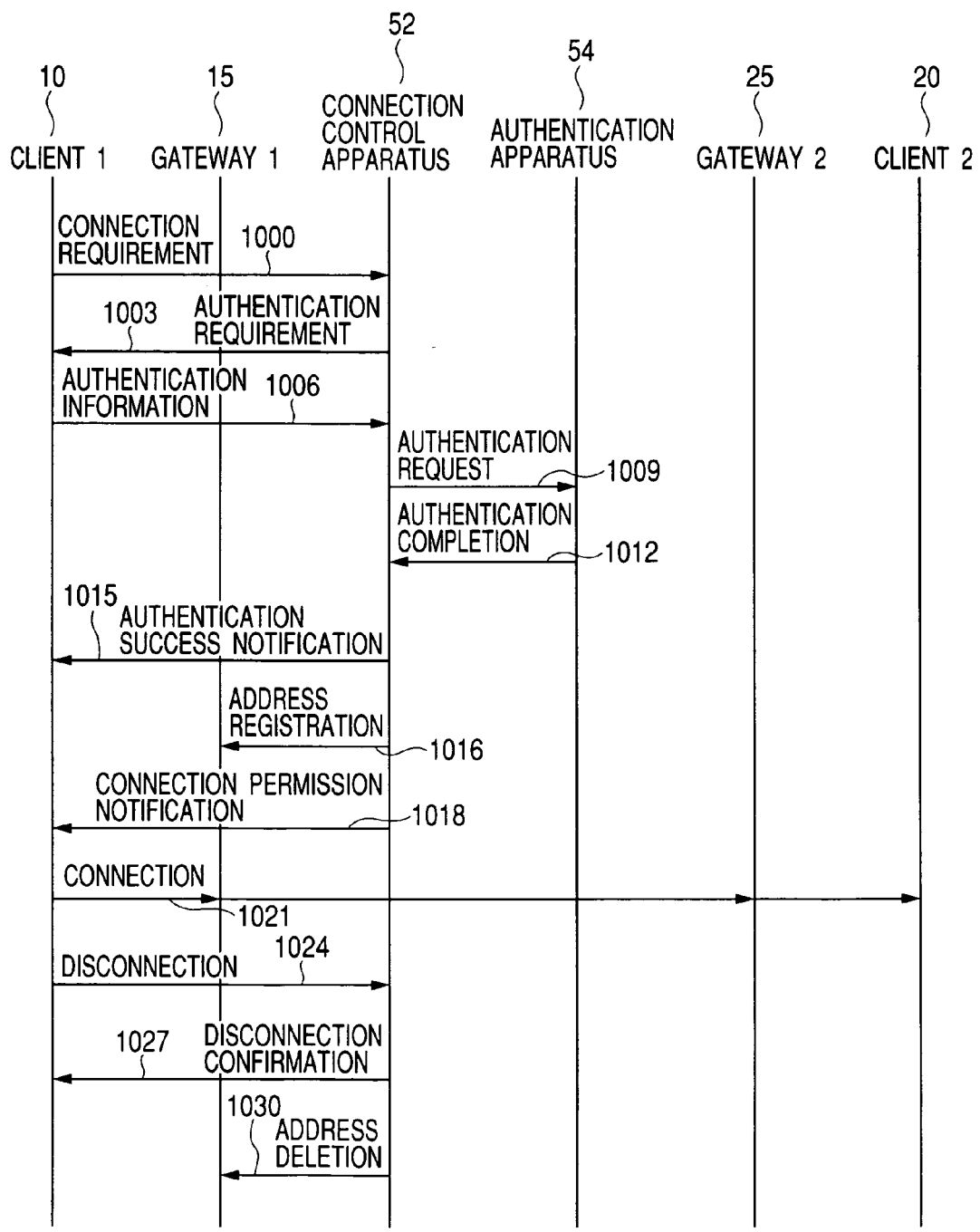
FIG. 10 is a sequence diagram for explaining operations of the connection control system in the case that a detour circuit is not used.
Figure 19:
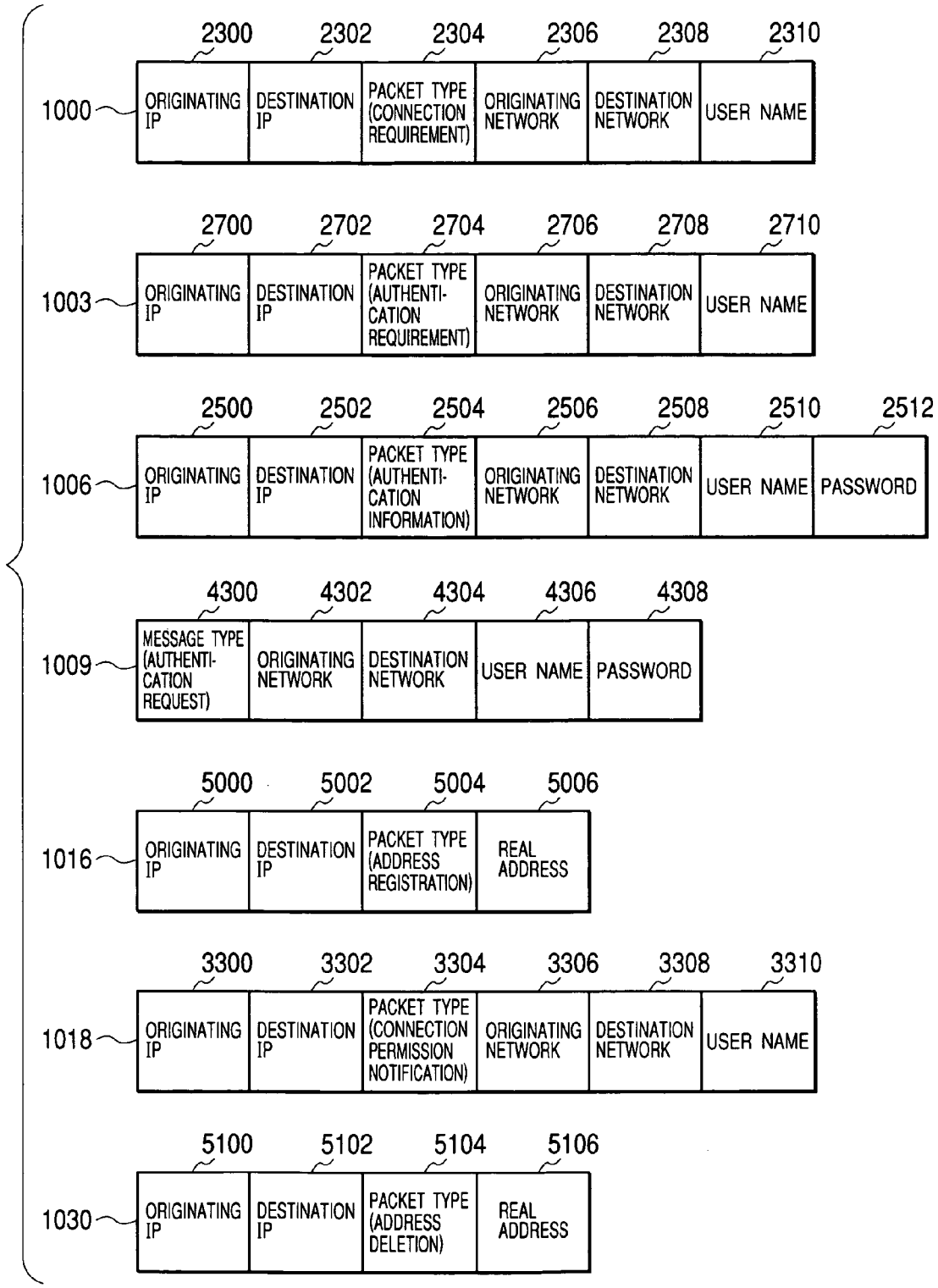
Figure 26:
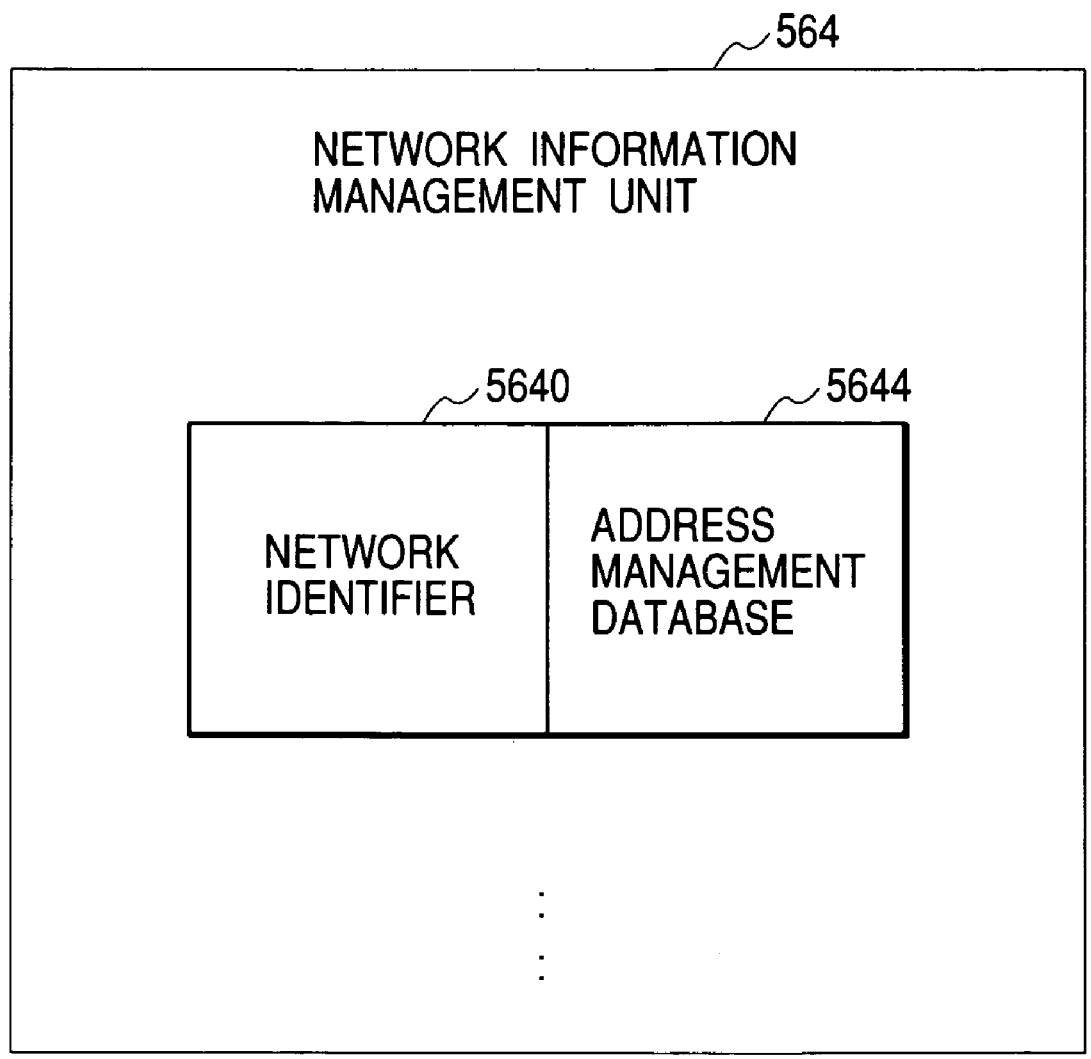
FIG. 26 is a block diagram for indicating a detailed content of a network information management unit when the IPv4 protocol is applied.

FIG. 9 shows a detailed content of the network information management unit 564. In the connection control system according to the present invention, IPv6 (Internet Protocol Version 6) is assumed to be used as a communication protocol. As a result, both a network identifier 5640 for identifying a network and a network prefix 5642 used within a network are required when an address for a detour path is generated. In the case that IPv4 is used, this network prefix 5642 is not required when an address is generated. Instead of this network prefix 5642, addresses of clients within the network are managed, and an unused address must be used as an address for a detour path. FIG. 26 indicates a network information unit 564 in the IPv4. The network information management unit 564 is provided with a network identifier 5640 and an address management database 5644. Next, operations of this connection control system will now be described in detail by using a sequence. FIG. 10 shows a basic sequence of the connection control system 5. Also, a content of a packet used in this sequence is indicated in FIG. 19. As previously explained, the following assumption is made in this connection control system 5. That is, it is so assumed that the connection from the network-1 1 to the network-2 2 is permitted; the connection from the network-2 2 to the network-3 3 is allowed; the connection from the network-3 3 to the network-4 4 are permitted; and all of the connections can be used as the detour paths. Under this assumption, the following case is considered. That is, the client-1 10 belonging to the network-1 1 is communicated with the client-2 20 belonging to the network-2 2. When the communication is commenced, the client-1 10 transmits a connection requirement 1000 from the network-1 1 to the network-2 2 via the gateway-1 15. In the below-mentioned description, it is so assumed that a communication operation from a client to the connection control apparatus 52 is carried out via a gateway unless a specific description is made. A content of the connection requirement 1000 is indicated in FIG. 19. The connection requirement 1000 contains as information, an originating IP 2300, a destination IP 2302, a packet type (connection requirement) 2304, an originating network 2306, a destination network 2308, and a user name 2310. The connection control apparatus 52 which has received the connection requirement 1000 inquires the connection policy database 524 as to whether or not the required connection is permitted. The connection policy database 524 compares the originating network 2306 of the connection requirement 1000 with the originating network 5242 contained in the database, and compares the destination network 2308 of the connection requirement 1000 with the destination network 5244 contained in the database in order to judge as to whether or not the required connection is permitted. Next, the connection control apparatus 52 inquires the user state management unit 526 as to whether or not authentication of this user is completed. In the case that an entry of this user is not present in the user state management unit 526, the connection control apparatus 52 produces an entry of this user, and transmits an authentication requirement 1003 to the client-1 10. In FIG. 19, there is shown a content of the authentication request 1003. The authentication request 1003 contains as information, an originating IP 2700, a destination IP 2702, a packet type (authentication request) 2704, an originating network 2706, a destination network 2708, and a user name 2710. In such a case that the entry of this user is present, the user state management unit 526 checks an authentication flag 5268 of the entry, and transmits the authentication requirement 1003 to the client-1 10 when the authentication flag 5268 is a falsehood. The client-1 10 receives this authentication requirement 1003, and sends authentication information 1006 to the connection control apparatus 52. A content of the authentication information 1006 is shown in FIG. 19. The authentication information 1006 contains as information, an originating IP 2500, a destination IP 2502, a packet type (authentication information) 2504, an originating network 2506, a destination network 2508, a user name 2510, and a password 2512. The connection control apparatus 52 which has received the authentication information 1006 transmits an authentication request 1009 to the authentication apparatus 54 so as to request an execution of authentication. A content of the authentication request 1009 is represented in FIG. 19. This authentication request 1009 contains as information, a message type (authentication request) 4300, an originating network 4302, a destination network 4304, a user name 4306, and a password 4308. The originating network 4306, the destination network 4304, the user name 4306, and the value of the password 4308, which are contained in the authentication request 1009, are acquired from the originating network 2506, the destination network 2508, the user name 2510, and the password 2512. The authentication apparatus 54 which has received the authentication request 1009 inquires the authentication database 542 as to whether or not authentication is permitted. The authentication apparatus 54 retrieves data records corresponding thereto from the authentication database 542 by employing the originating network 4302, the destination network 4304, and the user name 4306, which are contained in the authentication request 1009. Then, the authentication apparatus 54 compares the password 4308 contained in the authentication request 1009 with the password 5426 contained in the data record. When these passwords are made coincident with each other, the authentication apparatus 54 sends a completion of authentication to the connection control apparatus 52. This notificating operation is carried out by transmitting an authentication completion 1012. The connection control apparatus 52 which has received the authentication completion 1012 transmits an authentication success notification 1015 to the client-1 10. Since the authentication is completed at this time, the connection control apparatus 52 sets the authentication flag 5268 of the user to a truth, who has transmitted the authentication requirement 1003 of the user state management unit 526, and also sets the detour flag 5266 to a falsehood. After the authentication has been accomplished, the connection control apparatus 52 executes address registration 1016 of the user whose authentication has been completed in the gateway-1 15. A content of the address registration 1016 is indicated in FIG. 19. The address registration 1016 as information, contains an originating IP 5000, a destination IP 5002, a packet type (address registration) 5004, and a real address 5006. The gateway 15 registers the real address 5006 into the address registration table 120.

After the user state contained in the user state management unit 526 has been updated, the connection control apparatus 52 transits a connection permission notification 1018 to the client-1 10. A content of the connection permission notification 1018 is indicated in FIG. 19. The connection permission notification 1018 contains as information, an originating IP 3300, a destination IP 3302, a packet type (connection permission notification) 3304, an originating network 3306, a destination network 3308, and a user name 3310. The client-1 10 which has received the connection permission notification 1018 can be communicated with the client-2 20 at this time, and commences a communication operation with the client-2 20 via the gateway-1 15 and the gateway-2 25.

When the client-1 10 accomplishes the communication operation, this client-1 10 transmits a disconnection 1024 with respect to the connection control apparatus 52. The connection control apparatus 52 which has received the disconnection 1024 deletes the entry of the user state management unit 526, which corresponds to the user who has transmitted this disconnection 1024, and transmits a disconnection confirmation 1027 to the client-1 10. Finally, the connection control apparatus 52 transmits an address deletion 1030 to the gateway-1 15. A content of the address deletion 1030 is indicated in FIG. 19. The address deletion 1030 contains as information, an originating IP 5100, a destination IP 5102, a packet type (address deletion) 5104, and a real address 5106. The gateway-1 15 deletes the real address from the address registration table 120. Thereafter, in order that the client-1 10 is communicated with the client-2 20 via the connection control apparatus 52, the client-1 10 must send a connection requirement 1000 so as to obtain authentication. The normal connection process operation is completed by executing the above-described process operation.

Figure 11:
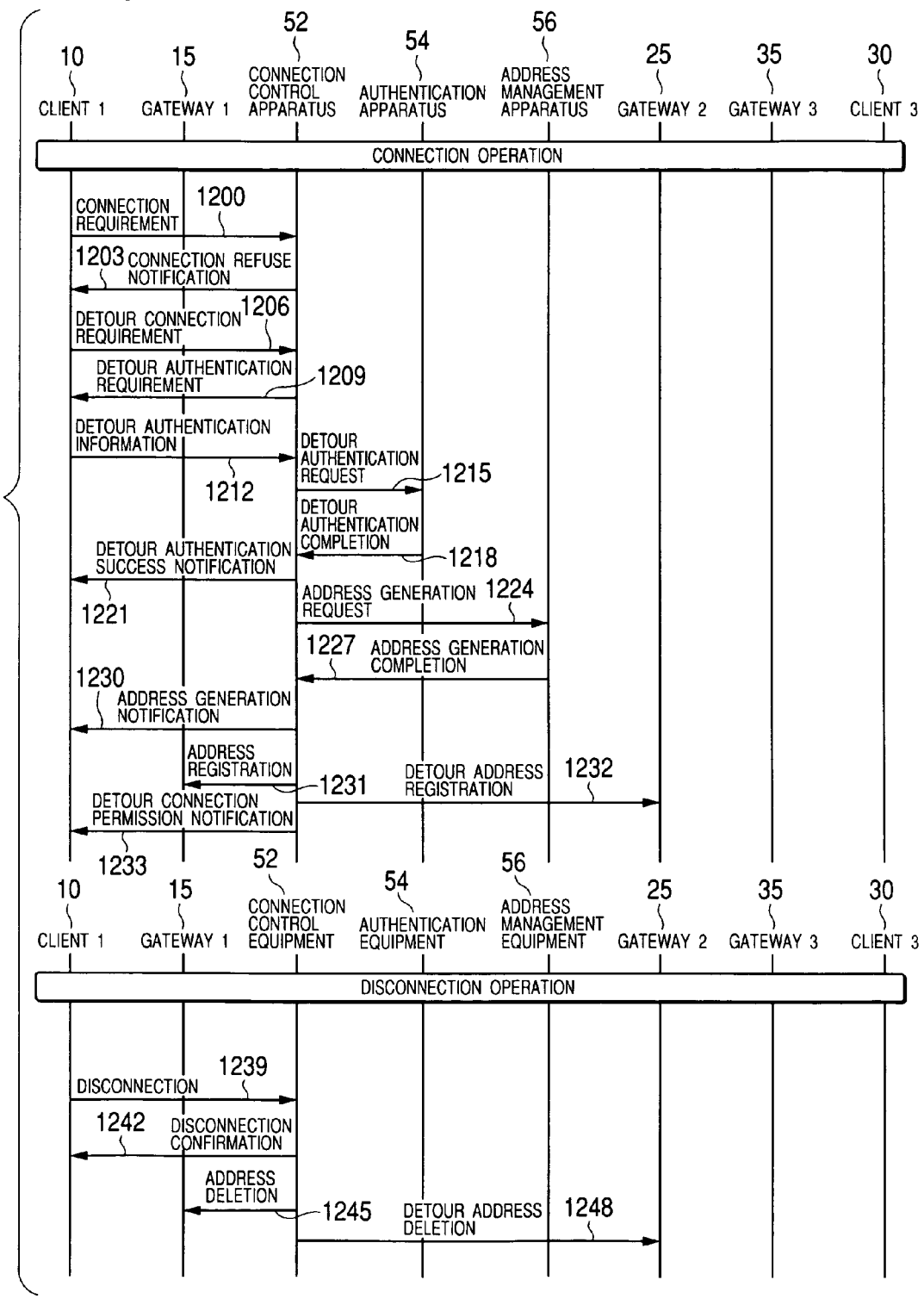
FIG. 11 is a sequence diagram for explaining operations of the connection control system in the case that the detour circuit is used.

Next, a communication between networks to which connection permission is not given will now be considered. FIG. 11 is a sequence for explaining process operations executed in such a case that a communication from the network-1 1 to the network-3 3 is requested. Such a case that the client-2 2 who has belonged to the network-2 2 is moved to the network-1 1 to become a (9) client-1 10, and this (9) client-1 10 is communicated via the client-3 30 belonging to the network-3 3 in FIG. 1 corresponds to this communication case.

The connection control system according to the present invention may solve such a problem that the networks having no connection permission cannot be connected to each other by executing a communication with employment of a detour path. The detour path corresponds to a communication path capable of realizing a communication between networks having no connection permission. In FIG. 1, although the connection permission from the network-1 1 to the network-3 3 is not present, both the connection permission from the network-1 1 to the network-2 2, and the connection permission from the network-2 2 and the network-3 3 are present. As a consequence, the communication from the network-1 1 to the network-3 3 may be realized by using a detour path through the network-2 2. At this time, a client is required to have such an address capable of satisfying a connection permission. In order that the client-1 1 is communicated with the client-3 30 belonging to the network-3 3 from the network-1 1 via the network-2 2, a communication operation must be carried out from the network-2 2 to the network-3 3. In order to satisfy the connection permission, the client-1 10 must own an address in the network-2 2. On the other hand, since the address owned by the client-1 10 belongs to the network-1 10, this client-1 10 cannot be communicated with the network-3 30 from the network-2 20 under this condition. As a result, the address management apparatus 56 applies an address usable in the network-2 20 to the client-1 10 as a detour address. Since the communication-purpose address in the network-2 2 is allocated to the client-1 10, the client-1 10 can be communicated with the client-3 30 via the network-2 20, namely by employing the detour path.

Figure 20:
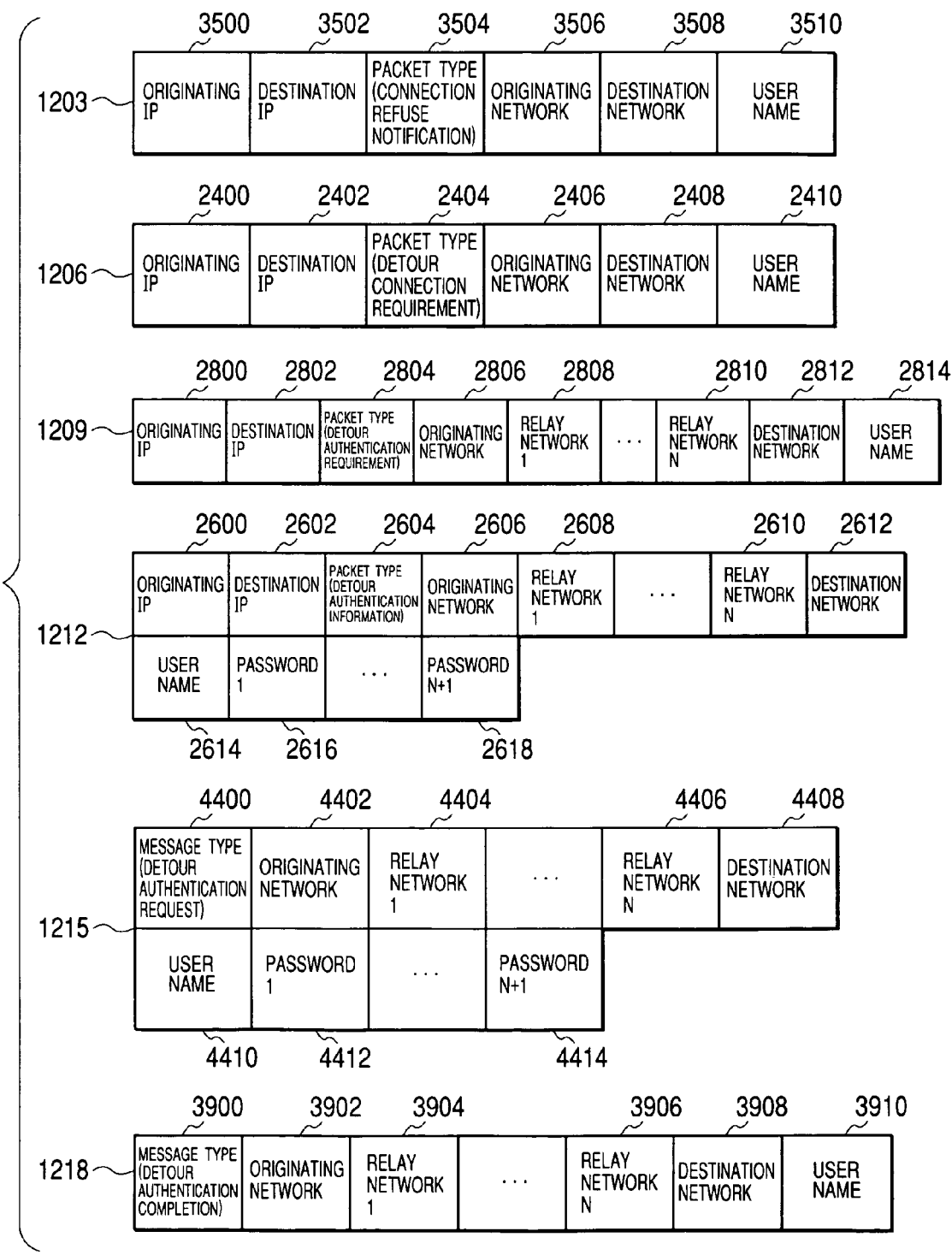
Figure 21:
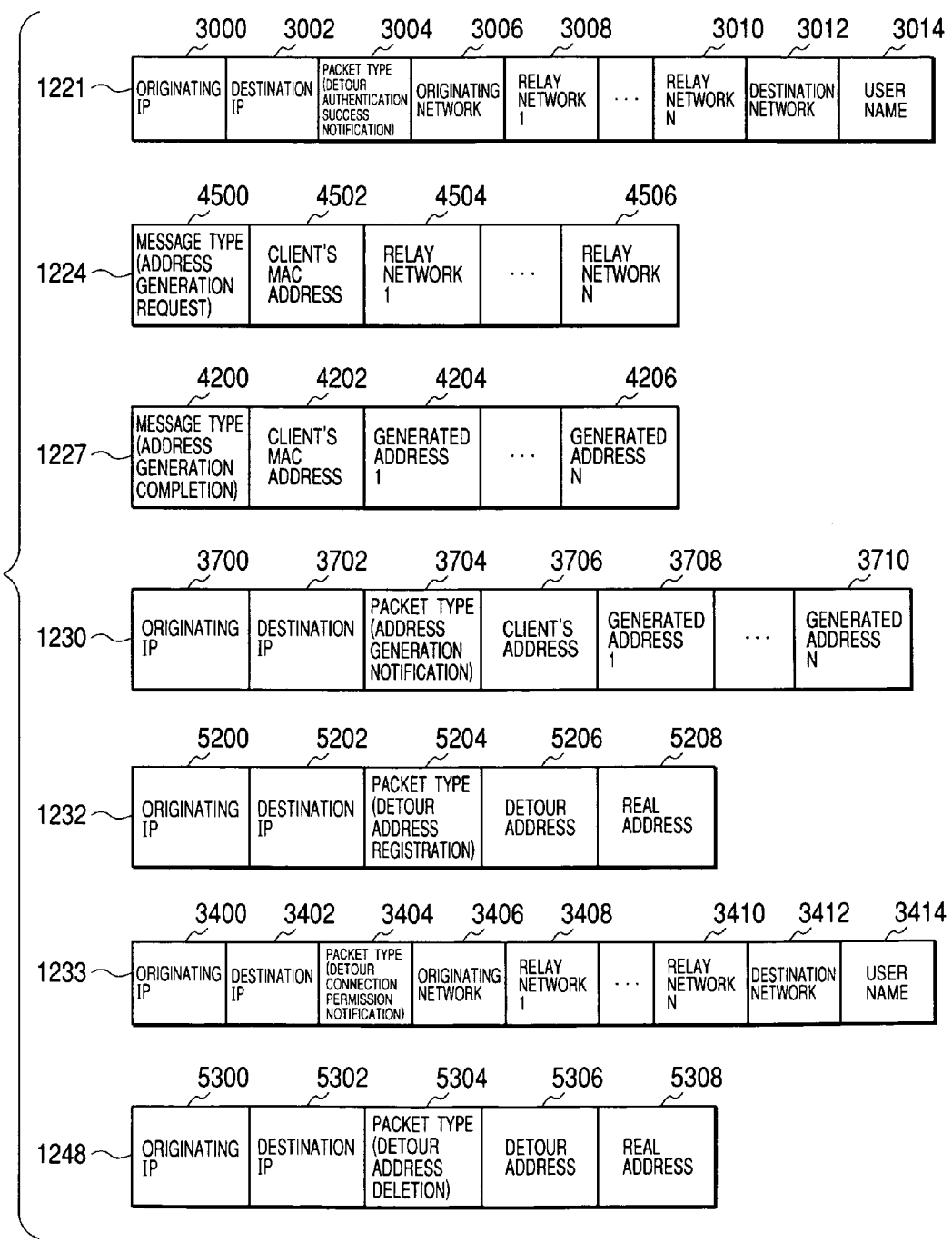

FIG. 11 indicates a communication sequence with employment of a detour path. A content of packet used in this communication sequence is shown in FIG. 20 and FIG. 21. The connection control apparatus 52 which has received a connection requirement 1200 interrogates the connection policy database 524 as to whether or not a required connection is permitted. Since the communication from the network-1 1 to the network-3 3 is not allowed, the connection control apparatus 52 transmits a connection refuse notification 1203 to the client-1 10. A content of the connection refuse notification 1203 is shown in FIG. 20. The connection refuse notification 1203 contains as information, an originating IP 3500, a destination IP 3502, a packet type (connection refuse notification) 3504, an originating network 3506, a destination network 3508, and a user name 3510. The client-1 10 which has received the connection refuse notification 1203 may grasp that the own client-1 10 cannot be directly connected from the network-1 1 to the network-3 3, and then, transmits a detour connection requirement 1206 to the connection control apparatus 52 so as to require a connection by way of a detour path. A content of the detour connection requirement 1206 is indicated in FIG. 20. The detour connection requirement 1206 contains as information, an originating IP 2400, a destination IP 2402, a packet type (detour connection requirement) 2404, an originating network 2406, a destination network 2408, and a user name 2410. In this example, the network-1 1 is designated as the originating network 2406, and the network-3 2 is designated as the destination network 2408. The connection control apparatus 52 which has received the detour connection requirement 1206 interrogates the connection policy database 524 as to whether or not the required detour path is present. The connection policy database 524 retrieves a detour path by employing both the originating network 2406 and the destination network 2408 of the detour connection requirement 1206. In such a case that a route connected from an originating network to a destination network can be constituted by coupling networks to each other which own the connection permission managed by the own connection policy database 524, the connection policy database 524 judges that this route can be used as the detour path. Coupling of networks implies as follows: That is, in such a case that a destination network of a certain connection permission 1 is made coincident with an originating network of another connection permission 2, such a new connection permission 3 is produced in which an originating network of the connection permission 1 is set as a connection originating network and a connection destination network of the connection permission 2 is set as a connection destination network. For instance, as to the network-3 3 from the network-1 1, such a route defined from the network-1 1 to the network-2 2, and another route defined from the network-2 2 to the network-3 3 are present within the connection permission contained in the connection policy database 524, so that a detour path can be formed by coupling the networks to each other. When the connection policy database 524 judges that the detour path can be made, the connection control apparatus 52 inquires the user state managing unit 526 as to whether or not authentication of the user who transmits the detour connection requirement 1206 is completed. Since an entry of this user has not yet been produced in the user state apparatus 526 at this time, the connection control apparatus 52 produces the entry of this user, and then transmits a detour authentication requirement 1209 to the client-1 10. A content of the detour authentication requirement 1209 is shown in FIG. 20. The detour authentication requirement 1209 contains as information, an originating IP 2800, a destination IP 2802, a packet type (detour authentication requirement) 2804, an originating network 2806, a relay network-1 2808, another relay network-N 2810, a destination network 2812, and a user name 2814. Symbol "N" indicates an N-th relay network. In this example, since the communication path is established through the network-2 2, the network-1 1 is designated as the originating network 2806; the network-2 2 is designated as the relay network-1 2808; and also, the network-3 3 is designated as the destination network 2812. To designate networks, such information capable of identifying the respective networks is employed. This identification information corresponds to, for example, an address of a gateway belonging to each of these networks, and a network identifier 5640 owned by the network information management unit 564 of the address management apparatus 56. The client-1 10 which has received a detour authentication requirement 1209 transmits detour authentication information 1212 to the connection control apparatus 52. The detour authentication information 1212 must contain authentication information which is required for all of relaying detour paths. A content of the detour authentication information 1212 is shown in FIG. 20. The detour authentication information 1212 contains an originating IP 2600, a destination IP 2602, a packet type (detour authentication information) 2604, an originating network 2606, a relay network-1 2608, another relay network-N 2610, a destination network 2612, a user name 2614, a password-1 2616, and another password-(N+1) 2618. The password-1 2616 indicates such a password which is required when a communication path is connected from the relay network I-1 to the relay network I. A relay network-0 corresponds to the originating network 2608, and the relay network (N+1) corresponds to the destination network 2610. The connection control apparatus 52 which has received the detour authentication information 1212 transmits a detour authentication request 1215 to the authentication apparatus 54 so as to request an execution of authentication. A content of the detour authentication requirement 1215 is shown in FIG. 20. The detour authentication requirement 1215 contains a message type (detour authentication requirement) 4400, an originating network 4402, a relay network-1 4404, another relay network-N 4406, a destination network 4408, a user name 4410, a password-1 4412, another password-(N+1) 4414. A relationship between a suffix of a relay network and a suffix of a password is similar to that of the detour authentication information 1212. The authentication apparatus 54 which has received the detour authentication request 1215 interrogates the authentication permission 542 as to whether or not authentication is succeeded. The authentication apparatus 54 compares the relay network I-1, the relay network-I, the user name 4410, and the password-I with the originating network 5422, the destination network 5424, the user name 5420, and the password 5426, respectively, with respect to all of the passwords contained in the detour authentication request 1215. Then, in the case that there are data records with respect to all of the passwords, the authentication apparatus 54 notifies a completion of the authentication to the connection control apparatus. 52. This notification is carried out by sending a detour authentication completion 1218. A content of the detour authentication completion 1218 is indicated in FIG. 20. The detour authentication completion 1218 contains as information, a message type (detour authentication completion) 3900, an originating network 3902, a relay network-1 3904, another relay network-N 3906, a destination network 3908, and a user name 3910. The connection control apparatus 52 which has received the detour authentication completion 1218 transmits a detour authentication success notification 1221 to the client-1 10. A content of the detour authentication success notification 1221 is shown in FIG. 21. The detour authentication success notification 1221 contains as information, an originating IP 3000, a destination IP 3002, a packet type (detour authentication success notification) 3004, an originating network 3006, a relay network-1 3008, another relay network-N 3010, a destination network 3012, and a user name 3014. Since the authentication is completed at this time, the connection control apparatus 52 sets both an authentication flag 5268 and a detour flag 5266 of this user of the user state management unit 526 to truths. As previously explained, when the detour connection is made, the detour addresses of the clients with respect to the respective relay networks must be produced. The connection control apparatus 52 requests the address management apparatus 56 to generate the detour addresses. This process operation is carried out by transmitting an address generation request 1224 to the address management apparatus 56. A content of the address generation request 1224 is indicated in FIG. 21. The address generation request 1224 contains as information, a message type (address generation request) 4500, a client's MAC address 4502, a relay network-1 4504, and another relay network-N 4506. The MAC address of the client can be extracted from the client address 5261 of the user state management unit 526. The address management apparatus 56 which has received the address generation request 1224 executes an address generation processing operation. The address is generated by employing both the client's MAC address 4502 contained in the received address generation request 1224, and the network prefix 5642 detected from the address of the gateway of the relay network-I. In the case of IPv4 protocol, the address management database 5644 is retrieved, and an unused address is employed as a generated address. The address generating apparatus 56 notifies the generated address to the connection control apparatus 52 by using an address generation completion 1227. A content of the address generation completion 1227 is indicated in FIG. 21. The address generation completion 1227 contains as information, a message type (address generation completion) 4200, a client's MAC address 4202, a generated address-1 4204, and another generated address-N 4206. The generated address I corresponds to such an address corresponding to the relay network I of the address generation request 1224. The connection control apparatus 52 which has received the address generation completion 1227 registers the address into a detour address of the user state management unit 526. In this case, the detour address for the network-2 2 is registered as a detour address-1 5270. Next, an address generation notification 1230 is transmitted to the client-1 10 so as to notify the generated address. A content of the address generation notification 1230 is shown in FIG. 21. The address generation notification 1230 contains as information, an originating IP 3700, a destination IP 3702, a packet type (address generation notification) 3704, a client address 3706, a generated address-1 3708, and another generated address-N 3710. The client-1 10 receives an address for the network-2 2, and uses this received address in the subsequent communication operation. A content of this process operation will be explained later. The connection control apparatus 52 which has accomplished the notification of the address to the client-1 10 executes an address registering operation with respect to such a gateway present on the communication path in order that a detour connection can be made. As the gateway present on the communication path, while there are the gateway-1 15, the gateway-2 25, and the gateway-3 35, the connection control apparatus 52 registers such an address which is required to execute the detour communication to the gateway-1 15, and another address which is required to perform the detour communication to the gateway-2 25. The connection control apparatus 52 transmits address registration 1231 to the gateway-1 15. The address which is registered in this case corresponds to the address of the client-1 10, and this address has been stored in the client address 5261 of the user state management unit 526. Next, the connection control apparatus 52 transmits detour address registration 1232 to the gateway-2 25. A content of the detour address registration 1232 is indicated in FIG. 21. The detour address registration 1232 contains as information, an originating IP 5200, a destination IP 5202, a packet type (detour address registration) 5204, a detour address 5206, and a real address 5208. The detour address 5206 corresponds to such an address which is required by that a client present in a destination network transmits a succeeding packet with respect to the network-2 2. In this case, the detour address 5206 corresponds to such an address which has been generated with respect to the network-2 (2). The real address 5208 corresponds to such an address which is required by that a gateway existed in a relay network transfers a subsequent packet. This real address corresponds to such an address which has been generated with respect to one-preceding relay network. In other words, in the case that the communication path is made via the network-I, the detour address corresponds to such an address which has been generated with respect to the network-I, and the real address corresponds to such an address which has been produced with respect to the network I-1. It should be noted that the network-1 corresponds to a network to which a client belongs. In this case, the address for the network-2 2 is designated as the detour address 5206. This address has been stored in the detour address-1 5270 of the user state management unit 526. The address of the client-1 10 is stored as the real address 5208. This address has been stored in the client address 5261 of the user state management unit 526. The connection control apparatus 52 which has accomplished the address registering operation transmits a detour connection permission notification 1233 to the client-1 10. A content of the detour connection permission notification 1233 is shown in FIG. 21. The detour connection permission notification 1233 contains as information, an originating IP 3400, a destination IP 3402, a packet type (detour connection permission notification) 3404, an originating network 3406, a relay network-1 3408, another relay network-N 3410, a destination network 3412, and a user name 3414. The client-1 10 who has received the detour connection permission notification 1233 is communicated with the client-3 30 via the gateway-1 15, the gateway-2 25, and the gateway-3 35.

When the client-1 10 accomplishes the communication operation, the client-1 10 transmits a disconnection 1239 with respect to the connection control apparatus 52. The connection control apparatus 52 which has received the disconnection 1239 deletes an entry of the user state management unit 526, which corresponds to the user who has transmitted the disconnection 1239, and then sends a disconnection confirmation 1242 to the client-1 10. Finally, the connection management apparatus 52 transmits an address deletion 1245 to the gateway-1 15 so as to delete the address registered in the gateway. A content of the address deletion 1245 is similar to the content of the address deletion 1030 shown in FIG. 19. The gateway-1 15 deletes the real address 5106 from the address registration table 120. Subsequently, in order that the client-1 10 is communicated with the client-3 30 via the connection control apparatus 52 by way of the detour connection, this client-1 10 must again send a detour connection requirement 1206 so as to obtain authentication. Next, the connection control apparatus 52 transmits a detour address deletion 1248 to the gateway-2 25. A content of the detour address deletion 1248 is shown in FIG. 21. The detour address deletion 1248 contains an information, an originating IP 5300, a destination IP 5302, a packet type (detour address deletion) 5304, a detour address 5306, and a real address 5308. The detour connection processing operation is completed by executing the above-described process operations.

Next, operations of the respective function blocks will now be described in detail with reference to flow charts.

Figure 12:
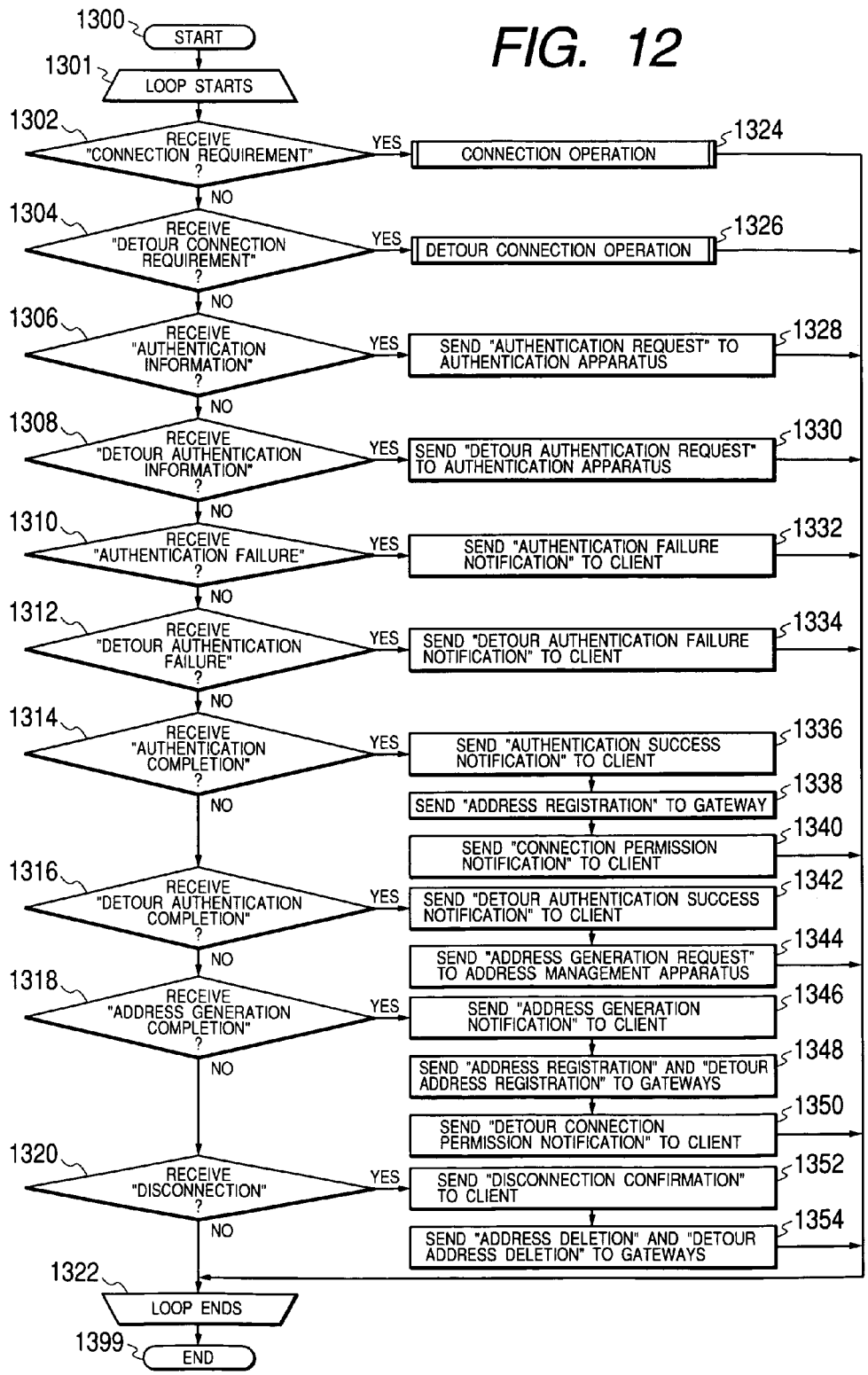
FIG. 12 is a flow chart for explaining process operations of the connection control apparatus.
Figure 22:
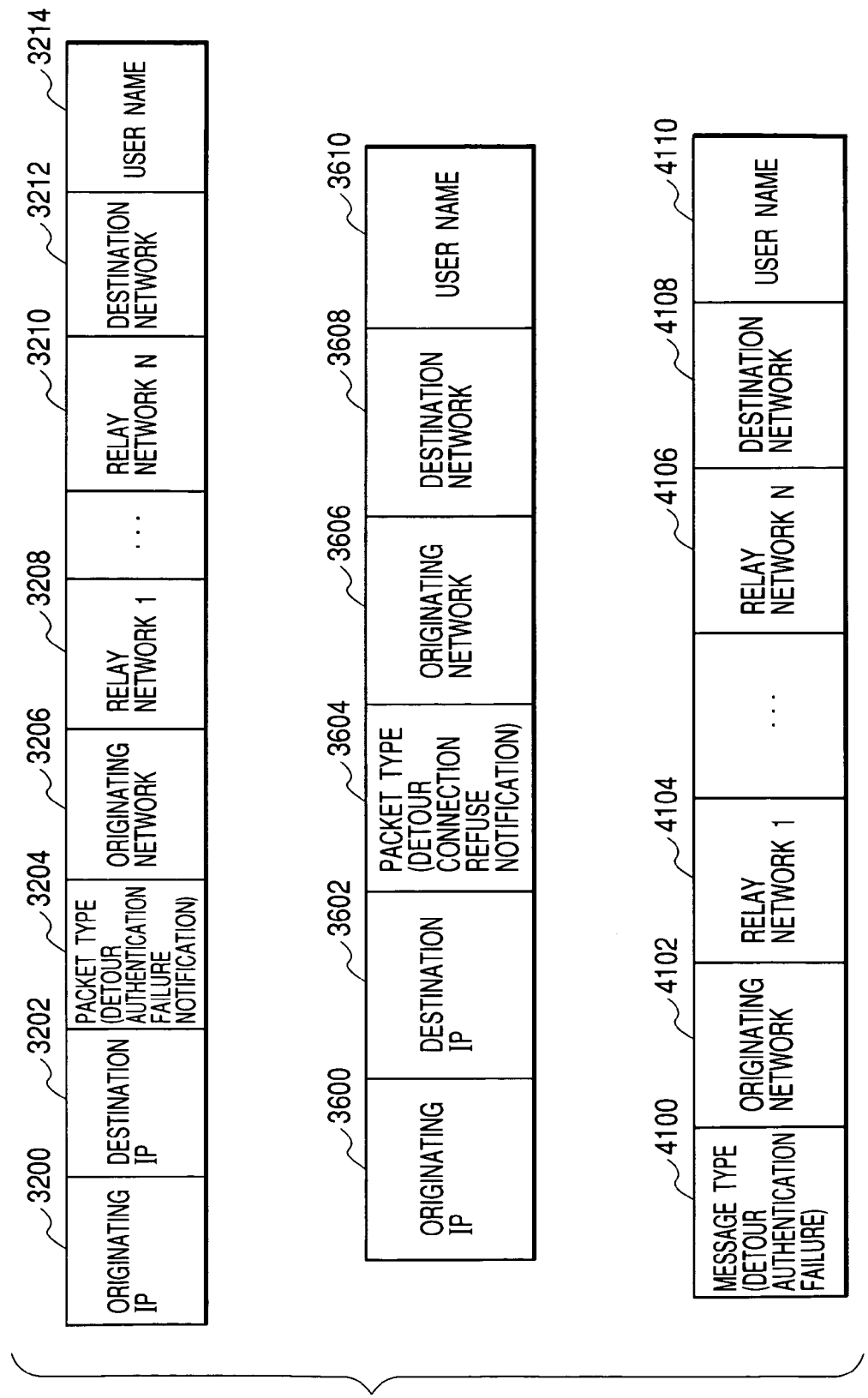

FIG. 12 is a flow chart for explaining operations of the connection control apparatus 52. When the connection control system is initiated, the connection control apparatus 52 commences the process operation (step 1300), and then is entered to a message/packet receiving loop (step 1301). In the case that the received message is a connection requirement 1000 (step 1302), the connection control apparatus 52 executes a connection operation (step 1324). This connection operation (step 1324) will be discussed later. In the case that the received message is a detour connection requirement (1206) (step 1304), the connection control apparatus 52 executes a detour connection operation (step 1326). The detour connection operation (step 1326) will be explained later. In the case that authentication information 1006 is received (step 1306), the connection control apparatus 52 requests the authentication apparatus 54 to execute authentication (step 1328). In the case that detour authentication information 1212 is received (step 1308), the connection control apparatus 52 requests the authentication apparatus 54 to execute detour authentication (step 1330). In the case that an authentication failure is received (step 1310), the connection control apparatus 52 notifies a connection failure to a client (step 1332). The authentication failure corresponds to such a message for notifying such a fact that the authentication apparatus 54 fails in authentication to the connection control apparatus 52. In the case that a detour authentication failure is received (step 1312), the connection control apparatus 52 notifies the detour authentication failure to a client (step 1334). The detour authentication failure corresponds to such a message for notifying such a fact that the authentication apparatus 54 fails in detour authentication to the connection control apparatus 52. A content of the detour authentication failure is shown in FIG. 22. The detour authentication failure contains as information, a message type (detour authentication failure) 4100, an originating network 4102, a relay network-1 4104, a relay network-N 4106, a destination network 4108, and a user name 4110. The connection control apparatus 52 transmits a detour authentication failure notification to a client. A content of the detour authentication failure notification is shown in FIG. 22. The detour authentication failure notification contains as information, an originating IP 3200, a destination IP 3202, a packet type (detour authentication failure notification) 3204, an originating network 3206, a relay network-1 3208, a relay network-N 3210, a destination network 3212, and a user name 3214. In the case that an authentication completion 1012 is received (step 1314), the connection control apparatus 52 transmits an authentication completion notification 1015 to a client so as to notify an authentication completion (step 1336), transmits gateway address registration 1030 so as to register an address of a client into the address registration table 120 (step 1338), and also, transmits a connection permission notification 1018 to a client so as to commence a communication operation (step 1340). When a detour authentication completion 1218 is received (step 1316), the connection control apparatus 52 transmits a detour authentication completion notification 1221 to a client so as to notify a detour authentication completion (step 1342), and transmits an address generation request 1224 to the address management apparatus 56 in order to request a generation of an address (step 1344). In such a case that an address generation completion 1227 is received (step 1318), the connection control apparatus 52 transmits an address generation notification 1230 to a client (step 1346), and registers both the address of the client and the generated detour address into a gateway by way of the address registration 1231 and the detour address registration 1232 (step 1348), and also, transmits a detour connection permission notification (1233) to the terminal (step 1350). In the case that a connection completion 1239 is received from a client (step 1320), the connection control apparatus 52 transmits a disconnection confirmation 1242 to the client (step 1352), and deletes the relevant address from the gateway by way of the detour address deletion (1248) and the address deletion (1245) (step 1354). When the connection control system is stopped, the packet/message reception loop is stopped (step 1322), and then, the operation of the connection control apparatus 52 is ended (step 1399).

Figure 13:
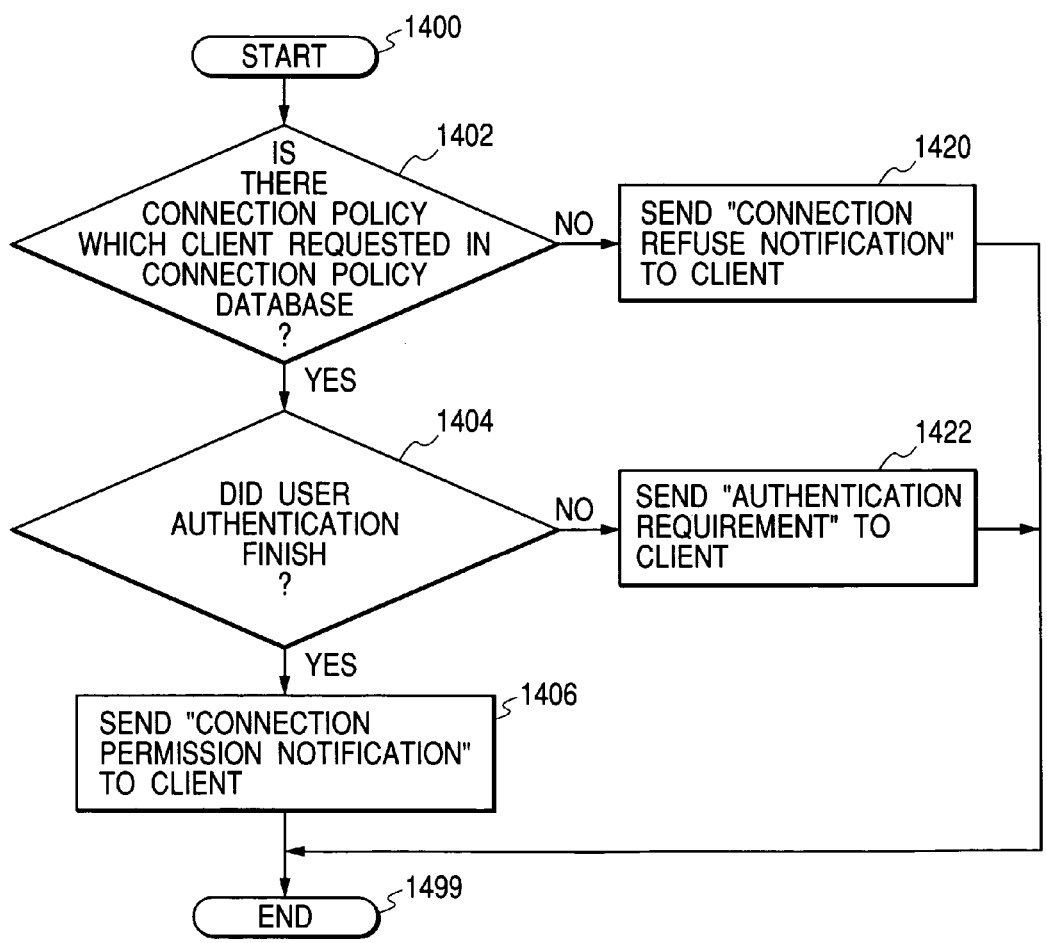
FIG. 13 is a flow chart for explaining a connection process operation.

Next, a condition of connection processing operation is represented in FIG. 13. When the connection processing operation is commenced (step 1400), in order to grasp as to whether or not the firstly required connection has been permitted, the connection policy database 524 is retrieved (step 1402). When the corresponding data record is not located in the connection policy database 524, the connection control apparatus 52 transmits a connection refuse notification (1203) to a client (step 1420), and then the connection processing operation is ended (step 1499). In the case that the relevant data record is present in the connection policy database 524, the user state management unit 526 is retrieved and a check is made as to whether or not authentication has been accomplished (step 1404). In the case that the authentication has not yet been completed, the connection control apparatus 52 transmits an authentication requirement 1003 to a client (step 1422), and then the connection processing operation is ended (1499). In the case that the authentication has been completed, a connection permission notification 1018 (step 1406), and the connection processing operation is accomplished (step 1499).

Figure 14:
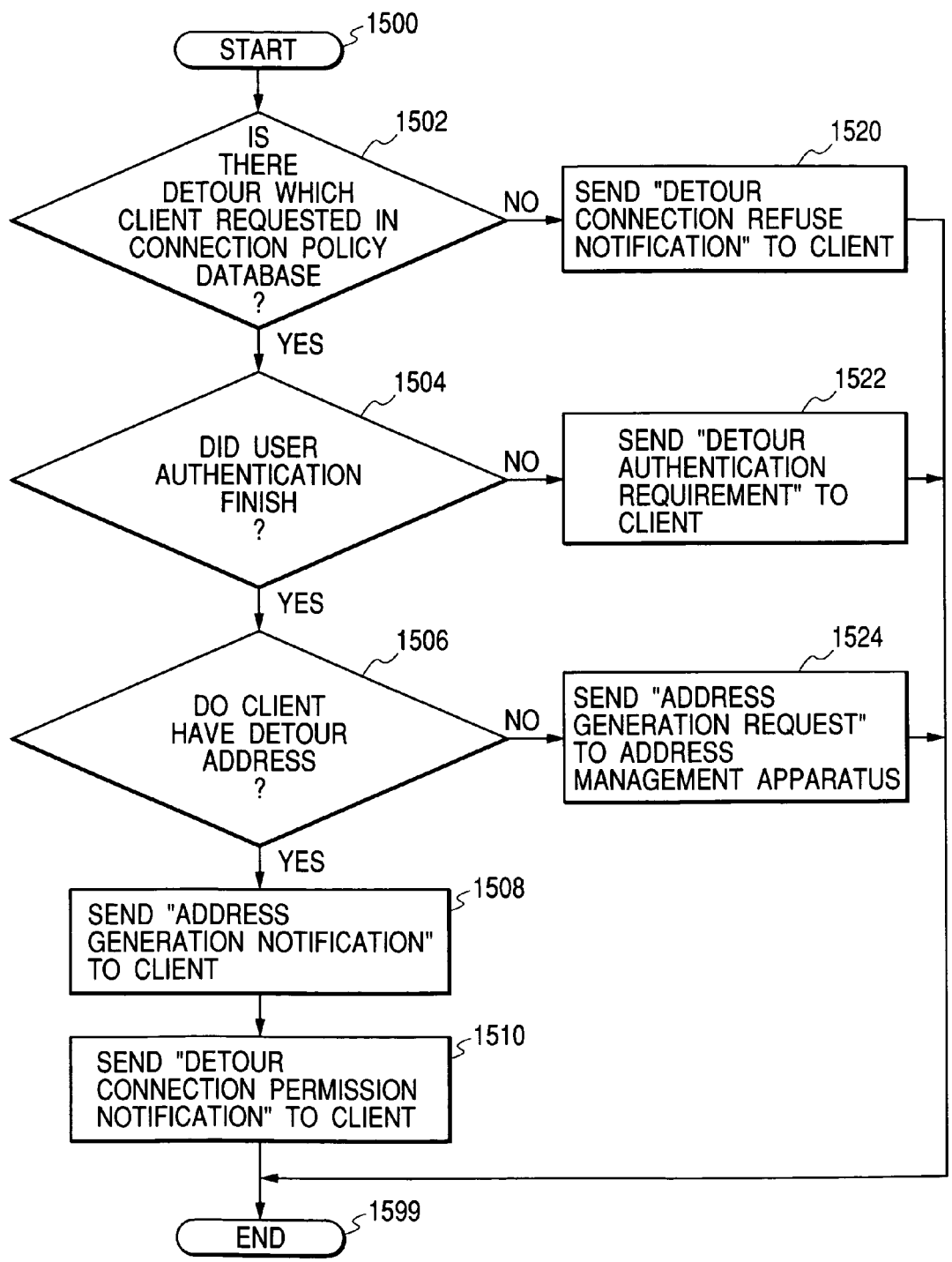
FIG. 14 is a flow chart for describing a detour connection process operation.

Next, a condition of detour connection processing operation is represented in FIG. 14. When the detour connection processing operation is commenced (step 1500), in order to grasp as to whether or not the firstly required detour path is present, the connection policy database 524 is retrieved (step 1502). In such a case that the detour path cannot be calculated from the connection policy database 524, the connection control apparatus 52 transmits a detour connection refuse notification to a client (step 1520), and then the detour connection processing operation is ended (step 1599). A content of the detour connection refuse notification is shown in FIG. 22. The detour connection refuse notification contains as information, an originating IP 3600, a destination IP 3602, a packet type (detour connection refuse notification) 3604, an originating network 3606, a destination network 3608, and a user name 3610. In the case that the detour path is present, the user state management unit 526 is retrieved, and a check is made as to whether or not the authentication has been accomplished (step 1504). When the authentication has not yet been ended, the connection control apparatus 52 transmits a detour authentication requirement 1209 to a client (step 1522), and then the detour connection processing operation is ended (step 1599). When the authentication has been accomplished, the connection control apparatus 52 inquiries the user state management unit 526 as to whether or not an address has been generated. The address generation judgement is carried out by checking as to whether or not the detour address-1 5270 is present in such a case that the detour flag 5266 becomes a truth. When the address has not yet been generated, the connection control apparatus 52 transmits an address generation request 1224 to the address management apparatus 56 (step 1524). In the case that the address has already been generated, the connection control apparatus 52 transmits an address generation notification 1230 to a client so as to notify this generated address (step 1508), and transmits a detour connection permission notification 1233 (step 1510), and then, the detour connection processing operation is ended (step 1599).

Figure 15:
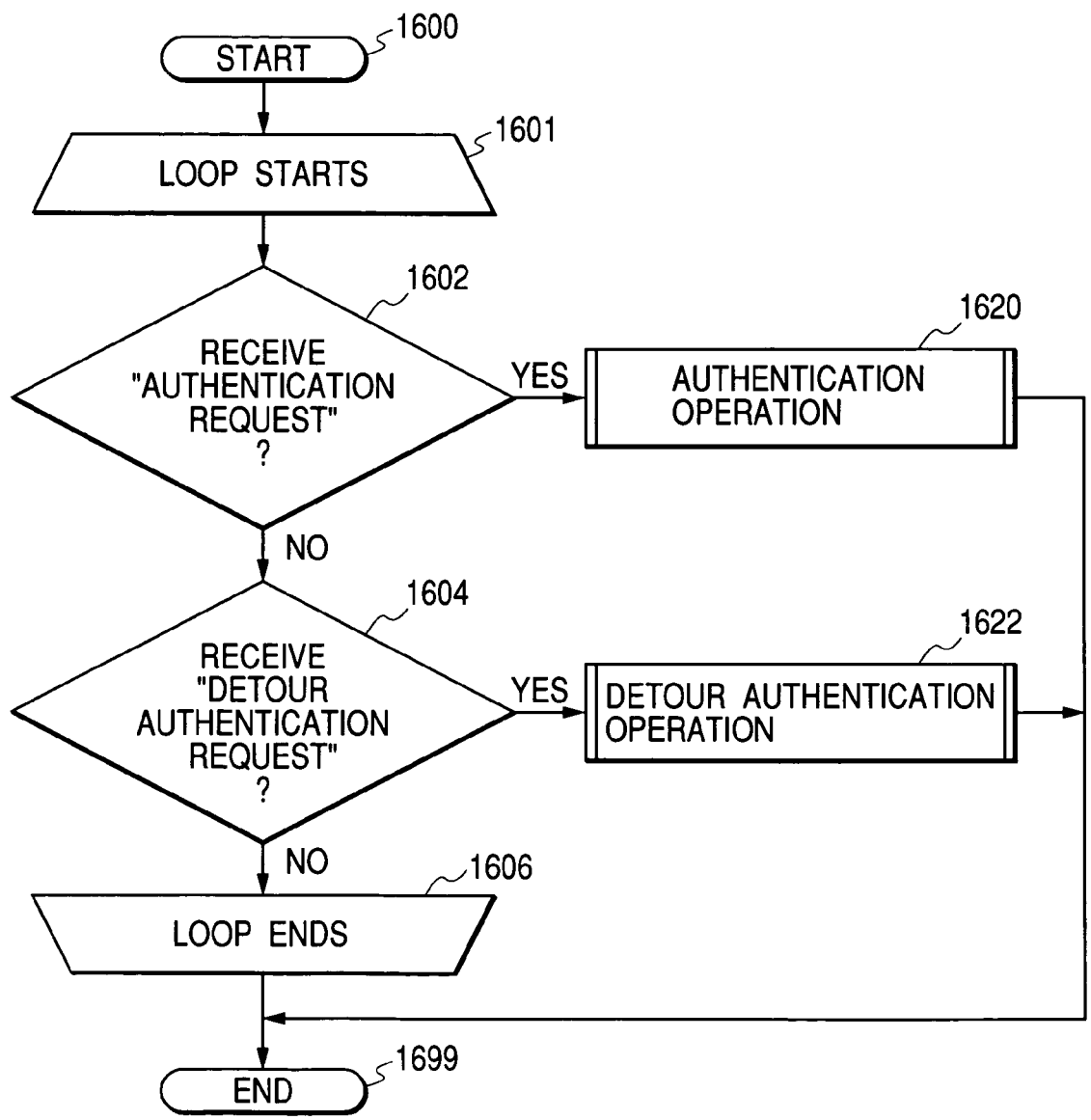
FIG. 15 is a flow chart for describing operations of the authentication apparatus.

FIG. 15 is a flow chart for explaining authentication process operation of the authentication apparatus 54. When the connection control system is initiated, the authentication apparatus 54 commences the authentication process operation (step 1600), and is entered into a message reception loop (step 1601). In the case that a received message corresponds to an authentication request 1009 (step 1602), the authentication apparatus 54 executes the authentication process operation (step 1620). A content of this authentication process operation will be described later. In the case that a received message corresponds to a detour authentication request 1215 (step 1604), the authentication apparatus 54 executes a detour authentication process operation (step 1622). When the connection control system is stopped, the message reception loop is stopped (step 1606), and then, the authentication process operation of the authentication apparatus 54 is ended (step 1699).

Figure 16:
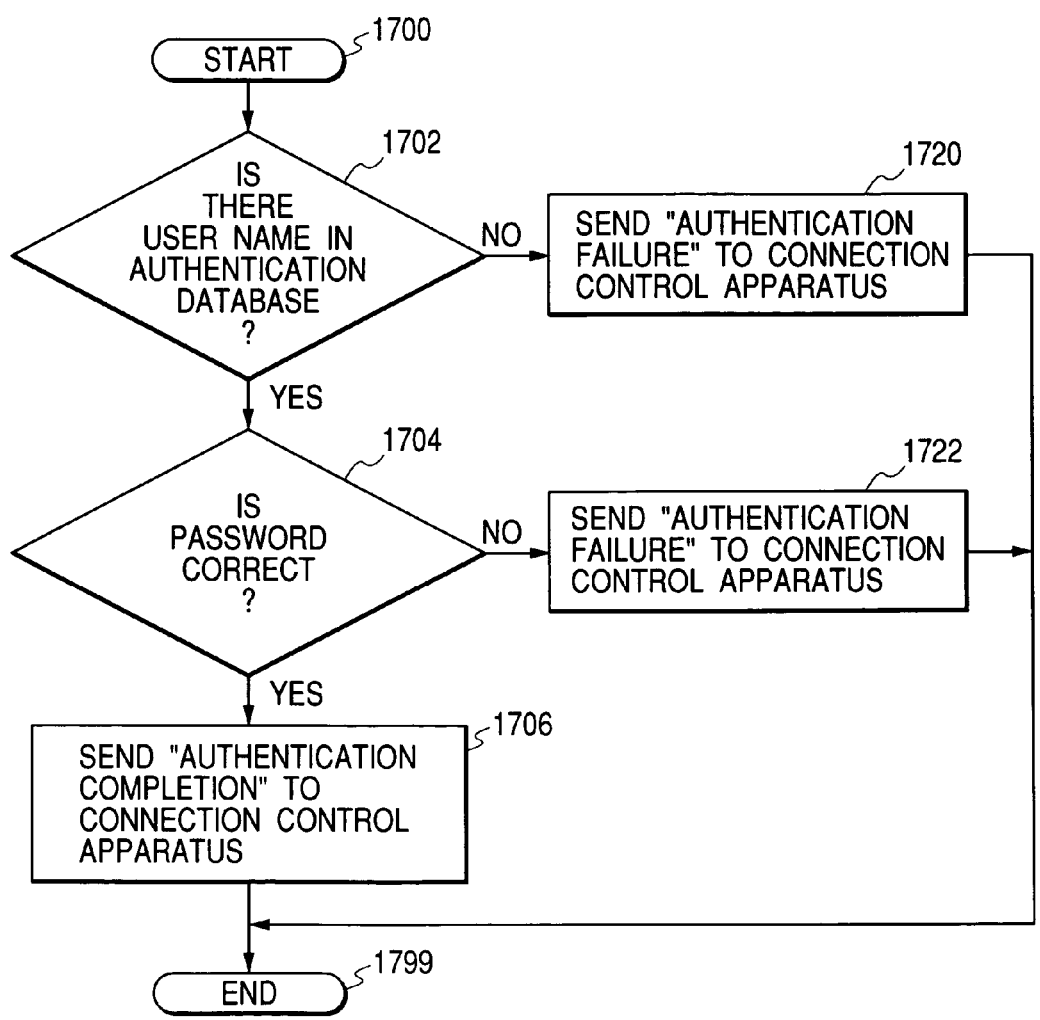
FIG. 16 is a flow chart for explaining an authentication process operation.

Next, a condition of an authentication process operation is represented in FIG. 16. When the authentication process operation is commenced (step 1700), a retrieving operation is firstly carried out as to whether or not a user name contained in authentication information is present in the authentication database 542 (step 1702). In the case that the user name is not present in the authentication database 542, the authentication apparatus 54 transmits an authentication failure to the connection control apparatus 52 (step 1720), and then the authentication process operation is ended (step 1799). In the case that the user name is present in the authentication database 542, a retrieving operation is carried out as to whether or not a password is justifiable (step 1704). When the password is not justifiable, the authentication apparatus 54 transmits an authentication failure to the connection control apparatus 52 (step 1722), and then the authentication process operation is ended (step 1799). When the password is justifiable, the authentication apparatus 54 transmits an authentication completion 1012 to the connection control apparatus 52 (step 1706), and then, the authentication process operation is ended (step 1799).

Figure 17:
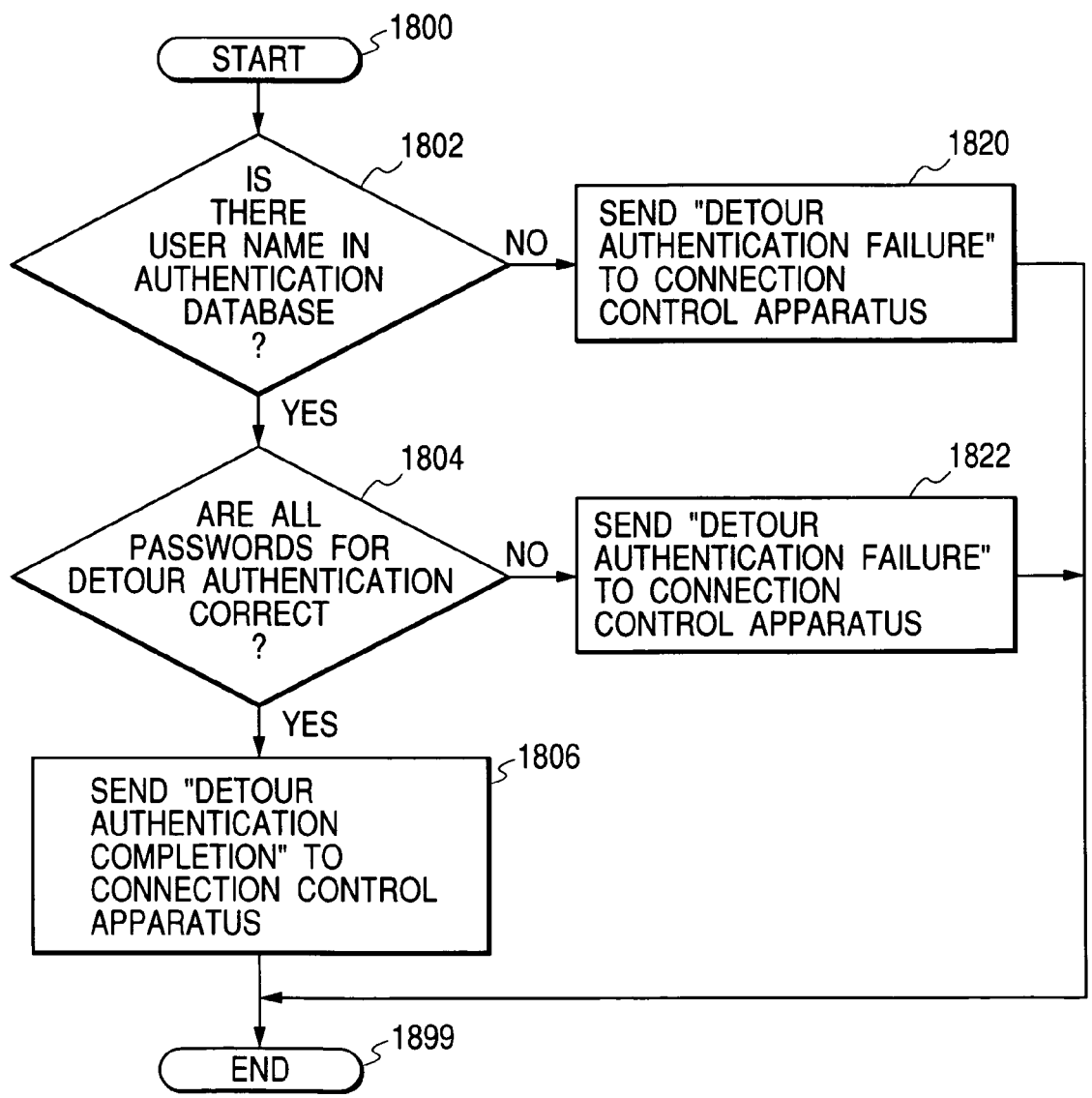
FIG. 17 is a flow chart for describing a detour circuit authentication process operation.

Next, a condition of a detour authentication process operation is represented in FIG. 17. When the detour authentication process operation is commenced (step 1800), a retrieving operation is firstly carried out as to whether or not a user name contained in authentication information is present in the authentication database 542 (step 1802). In the case that the user name is not present in the authentication database 542, the authentication apparatus 54 transmits a detour authentication failure to the connection control apparatus 52 (step 1820), and then the detour authentication process operation is ended (step 1899). In the case that the user name is present in the authentication database 542, a retrieving operation is carried out as to whether or not a password is justifiable (step 1804). Only in such a case that all of passwords required in detour authentication are justifiable, it is so regarded that the passwords are justifiable. When the password is not justifiable, the authentication apparatus 54 transmits a detour authentication failure to the connection control apparatus 52 (step 1822), and then the detour authentication process operation is ended (step 1899). When the password is justifiable, the authentication apparatus 54 transmits a detour authentication completion 1218 to the connection control apparatus 52 (step 1806), and then, the detour authentication process operation is ended (step 1899).

Figure 18:
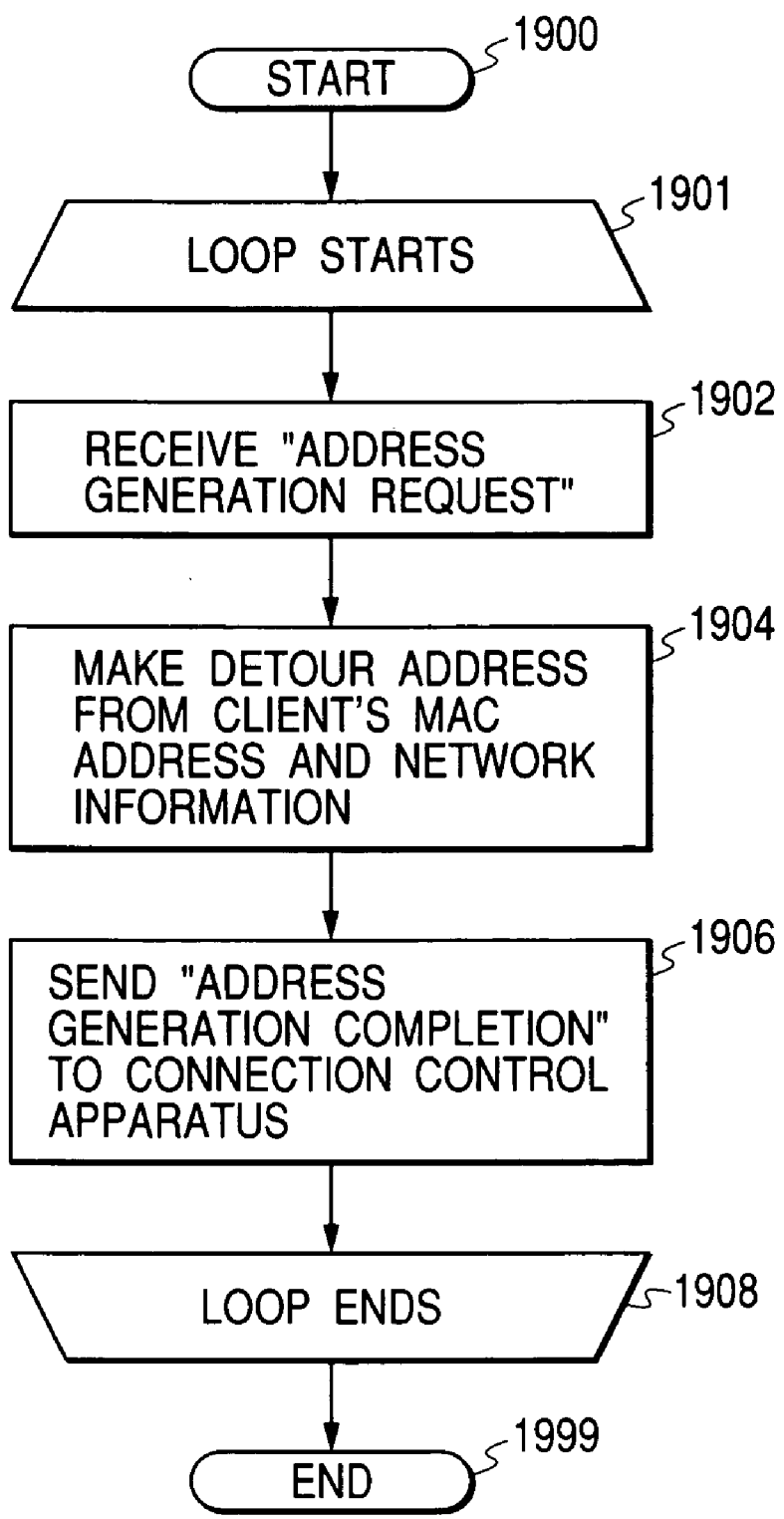
FIG. 18 is a flow chart for explaining operations of the address management apparatus.

FIG. 18 is a flow chart for explaining address managing process operation of the address management apparatus 56. When the connection control system is initiated, the address management apparatus 56 commences the address managing process operation (step 1900), and then is entered into a message reception loop (step 1901). When the address management apparatus 56 receives an address generation request 1224 (step 1902), the address management apparatus 56 generates a detour connection-purpose address from the client's MAC address 4502, the relay network-1 (4504), and the relay network-N (4506), which are contained in the message (step 1904), and then, transmits an address generation completion 1227 to the connection control apparatus 52 (step 1906). The message reception loop is stopped when the connection control system is stopped (step 1908), and then the address managing process operation of the address management apparatus 56 is ended (step 1999).

Figure 27:
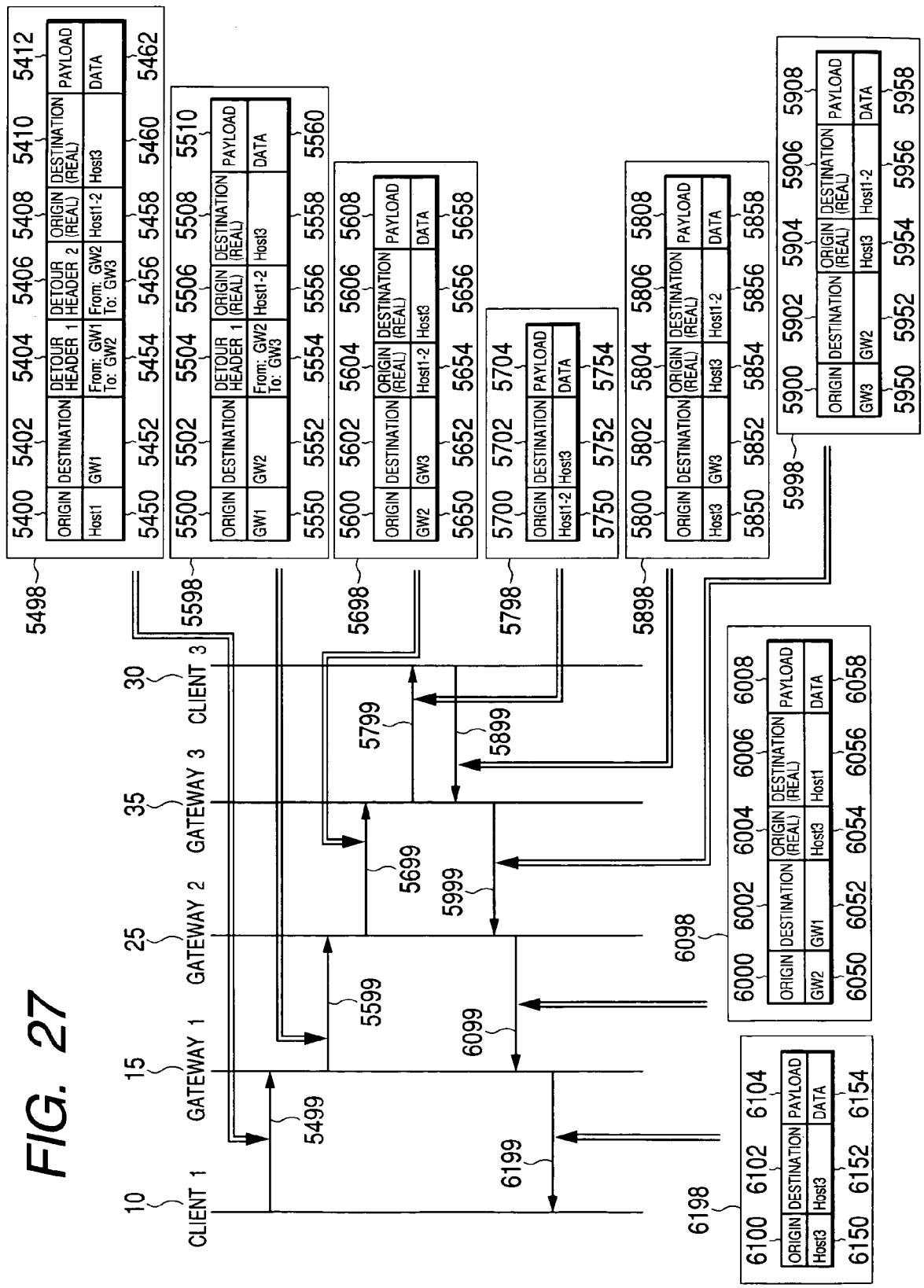
FIG. 27 is a detailed diagram for explaining a packet processing operation during communication operation.

Next, a description is made of a packet process operation executed in the case that the client-1 10 is communicated with the client-3 30. FIG. 27 shows a sequence as to when the client-1 10 is communicated with the client-3 30. In FIG. 11, at a such a time instant when the client-1 10 receives an address generation notification 1230, the client-1 10 holds an address used for the network-2 2 which is equal to a detour network-1. In this address firstly held by the client-1 10 is referred to as an address "Host1", and the detour address used for the network-2 2 is referred to as an address "Host1-2." When the gateway-I 15 receives address registration 1231, the address Host1 is registered in the address registration table 120 of the gateway-1 15, so that the client-1 10 can be communicated with another client via the gateway-1 15. When the gateway-2 25 receives a detour address registration 1232, the above-described address Host1-2 is registered as a detour address 13010, and the above-explained address Host1 is registered as a real address 13020 in the detour address registration table 130. All of the above-described information are required when a packet is transmitted from the client-3 30 to the client-1 10 in the detour connection. When the client-1 10 receives a detour connection permission notification 1233, this client-1 10 can grasp that a packet communication operation is carried out via the gateway-1 15, the gateway-2 25, and the gateway-3 35. The client-1 10 transmits a packet to the client-2 20 in accordance with the below-mentioned sequence. That is, the client-1 10 firstly sends a packet 5498 to the gateway-1 15 (step 5499). The packet 5498 which is transmitted from the client-1 10 to the gatewy-1 15 contains a real origin 5408 of the packet, a real destination 5410 thereof, an origin 5400 of a tunnel communication, a destination 5402 of the tunnel communication, a detour header-1 5404, another detour header-2 5406, and a payload 5412. Since the packet communication from the client-1 10 to the client-3 30 is firstly routed through the gateway-1 15, the address Host1 5450 is designated as the origin of the tunnel communication, and an address GW1 5452 is designated as the destination. Symbol "GW1" indicates an address of the gateway-1 15, and is contained in the originating network 3406 of the detour connection permission notification 1233. In order to satisfy the connection permission, the packet must be transmitted via the gateway-2 25 and the gateway-3 35. To realize this packet transmission, the client-1 10 inserts two sets of detour headers into the packet. The detour headers designate a transmission source and a transmission destination in a pair manner. In this embodiment, both a detour header 5454 from the gateway-1 15 to the gateway-2 25, and another detour header 5456 from the gateway-2 25 to the gateway-3 35 are designated respectively. As the real destination of the packet, an address "Host3" corresponding to the address of the client-3 30 is designated. In this case, the real origin may cause a problem. When the client-3 30 receives the packet, the cleint-3 30 can return this received packet from the network-3 3 only to such a network to which a connection permission is given. As a result, as the real origin, the detour address Host1-2 used for the network-2 2 is designated. Since a detour address is calculated in such a manner that a connection permission is necessarily given to a destination, a packet can be returned from the client-3 30 by designating this detour address as a real origin. Data 5462 which is wanted to be transmitted to the client-3 30 is loaded on the payload 5412. The gateway-1 15 which has received the packet 5498 sent from the client-1 10 processes this received packet in accordance with the below-mentioned sequence. That is, this gateway-1 15 grasps that a destination of a tunnel communication corresponds to the own gateway-1 15 based upon the origin 5400 and the destination 5402 of the tunnel communication, and then removes these items. Next, the gateway-1 15 retrieves the detour headers. Since such a detour header-1 5404 for requesting a detour path from the gateway-1 15 to the gateway-2 25 is contained in the packet 5498 which has been transmitted by the client-1 10 to the gateway-1 15, the origin of the tunnel communication is designated as an address GW1 5550 and also the destination thereof is designated as an address GW2 5552. Then, the gateway-1 15 removes one of these detour headers, and designates only the detour header from the gateway-2 25 to the gateway-3 35 (step 5554). AS to the real origin 5506, the real destination 5508, and the payload 5510, the original data is directly copied (steps 5556, 5558, 5560). Since the above-described process operations are executed, this gateway-1 15 transmits the packet 5593 to the gateway-2 25 (step 5599). The gateway-2 25 which has received this packet executes such a process operation, similar to that of the gateway-1 15 so as to transmit the packet 5698 to the gateway-3 35 (step 5699). The origin of the tunnel communication is the address GW2 5650, the destination thereof is the address GW3 5652, the real origin thereof is the address Host1-2 5654, and the real destination thereof is the address Host3 5656. The payload 5658 is not changed. The gateway-3 35 which has received the packet 5698 analyzes this packet 5698, and thus may grasp that no detour header is present. As a consequence, the gateway-3 35 does not tunnel-process the packet received from the gateway-2 25, but executes the process operation of the normal communication operation. Since the real destination of the packet is the address Host3, the gateway-3 35 constructs such a packet 5798 shown in FIG. 26. The origin of the packet corresponds to the address Host1-2 5750, and the destination thereof corresponds to the address Host3 5752. The payload 5754 is not changed. The packet 5798 which has been constructed in the above-described manner is reached to the client-3 30 (step 5799).

Next, a description is made of a packet which is returned from the client-3 30 to the client-1 10. The transmission source of the packet which is grasped by the client-3 30 corresponds to the address Host1-2 5750 which is designated based upon the origin 5700 of the packet 5798 received from the gateway-3 35. Based upon this information, the client-3 30 constitutes a packet 5898 which is sent to the client-1 10. The client-3 30 sets the real origin of the packet to the address Host3 5854, sets the real destination thereof to the address Host1-2 5856, sets the origin of the packet to the address Host3 5854, sets the real destination thereof to the address Host1-2 5856, sets the origin of the tunnel communication to the address Host3 5850, and also, sets the destination thereof to the address GW3 5852. The gateway-3 35 which has received this packet 5898 constitutes such a packet 5998 which is transmitted to the gateway-1 15, since the real destination of the packet corresponds to the address Host1-2. The real origin 5904 of this packet, the real destination 5906 thereof, and the payload 5908 thereof are not changed. The origin of the tunnel communication is set to the address GW3 5950, and the destination thereof is set to the address GW2 5952. The gateway-2 25 which has received this packet 5998 retrieves a transfer destination of the packet within the network-2 2. Since the address Host1-2 corresponds to a virtual address which is employed in the network-2 2 by the client-1 10, there is no transfer destination of the packet 5998. Under this condition, the gateway-2 25 retrieves the detour address registration table 130 and checks as to whether or not the relevant detour path is present. Since the address Host1-2 and the address Host1 have been registered as the detour address 13010 and the real address 13020 in the detour address registration table 130 of the gateway-2 25, the gateway-2 25 transmits the packet 5998 to the gateway-1 15. Based upon the above-explained information, the gateway-2 25 transmits a packet 6098 to the gateway-1 15 (step 6099). The origin 6050 of the tunnel communication is set to the address GW2, and the destination thereof is set to the address GW1 6052. The real origin remains as the address Host3, namely is not changed (step 6054). However, the real destination is changed into the address Host1 which corresponds to the real address 13020 extracted from the detour address registration table 130 (step 6056). The gateway-1 15 which has received the packet 6098 sent from the gateway-2 25 can grasp that the destination of the packet 6098 corresponds to the address Host1, and constructs a packet 6198, and then transmits this packet 6198 to the client-1 10 (step 6199). In this packet 6198, the origin thereof has been set to the address Host3 6150, and the destination thereof has been set to the address GW2 5952. The packet 6198 may be returned from the client-3 30 to the client-1 10 by executing the above-explained process operation.

Figure 23:
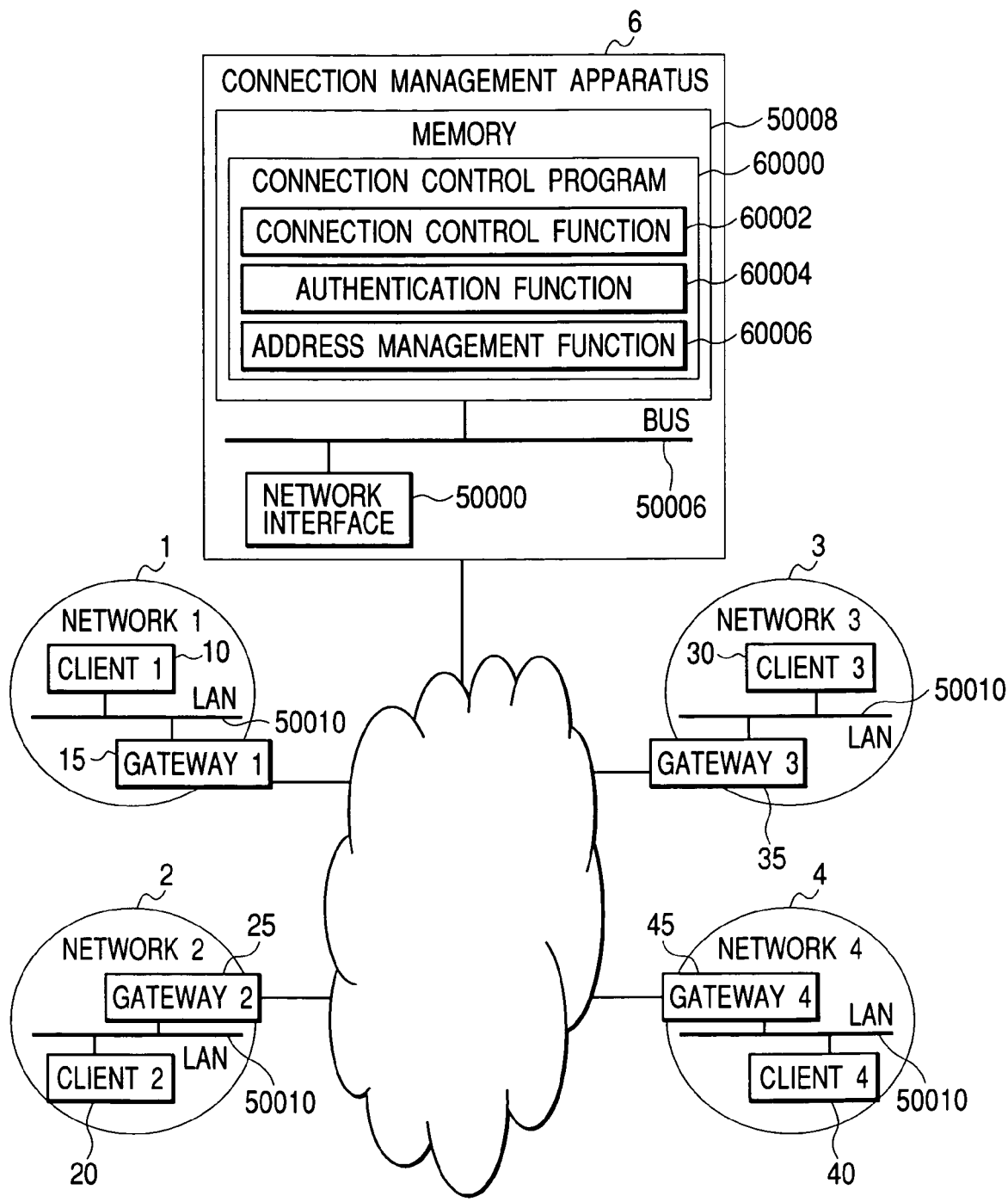
FIG. 23 is a schematic diagram for representing a system structural example made by the connection management apparatus.

Next, FIG. 23 represents such a construction that the connection control system is realized as a single connection management apparatus 6. The connection management apparatus 6 is equipped with at least a network interface 50000, a bus 50006, and a memory 50008 at minimum. The structure of the connection management apparatus 6 will be explained in FIG. 25. The connection management apparatus 6 is provided with a connection control function 60002, an authentication function 60004, and an address management function 60006, as a function of a connection management program 60000 operable on the memory 50008. The respective functions may provide equivalent functions to those of the connection control apparatus 52, the authentication apparatus 54, and the address management apparatus 56.

Figure 24:
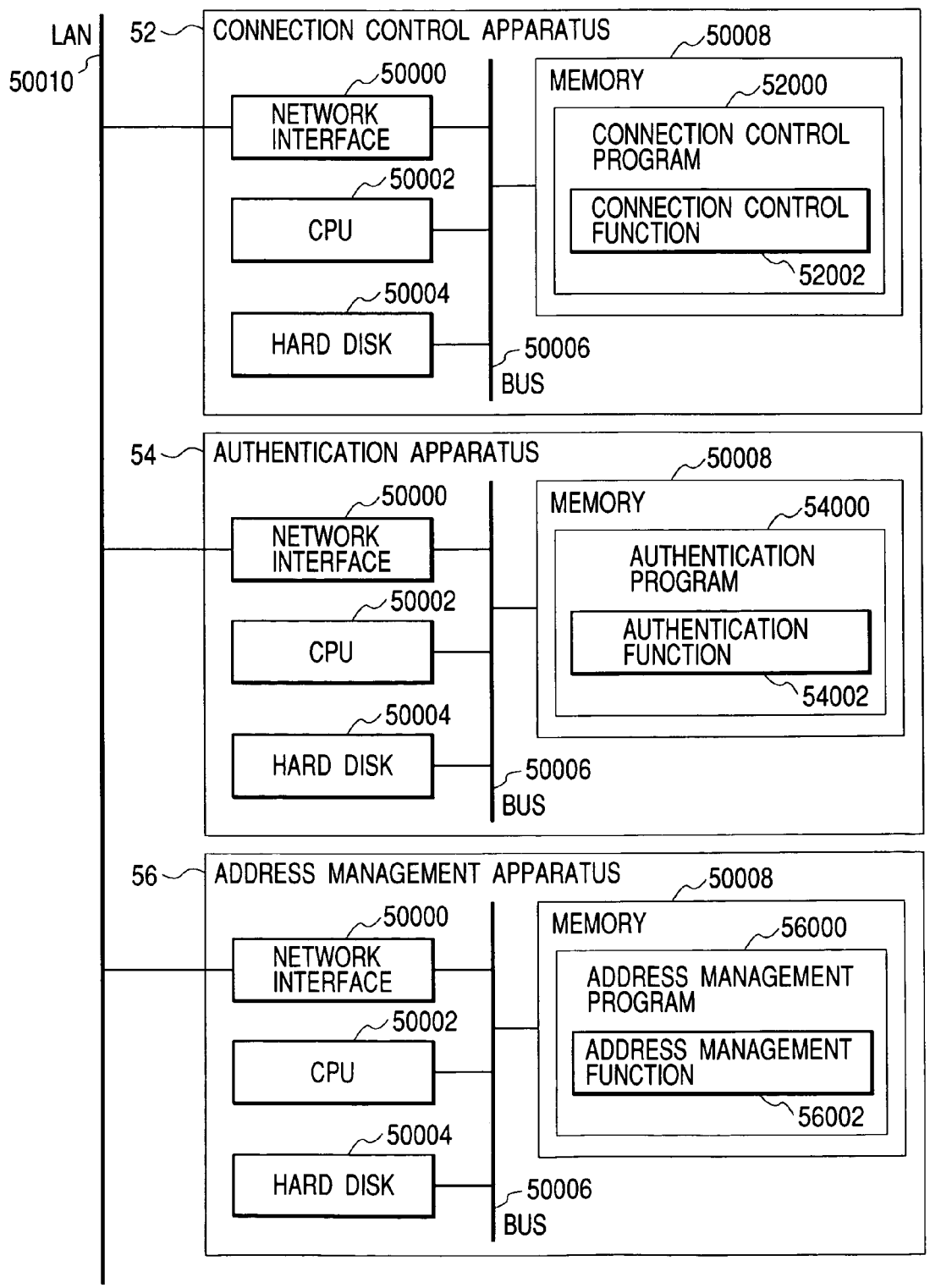
Figure 25:
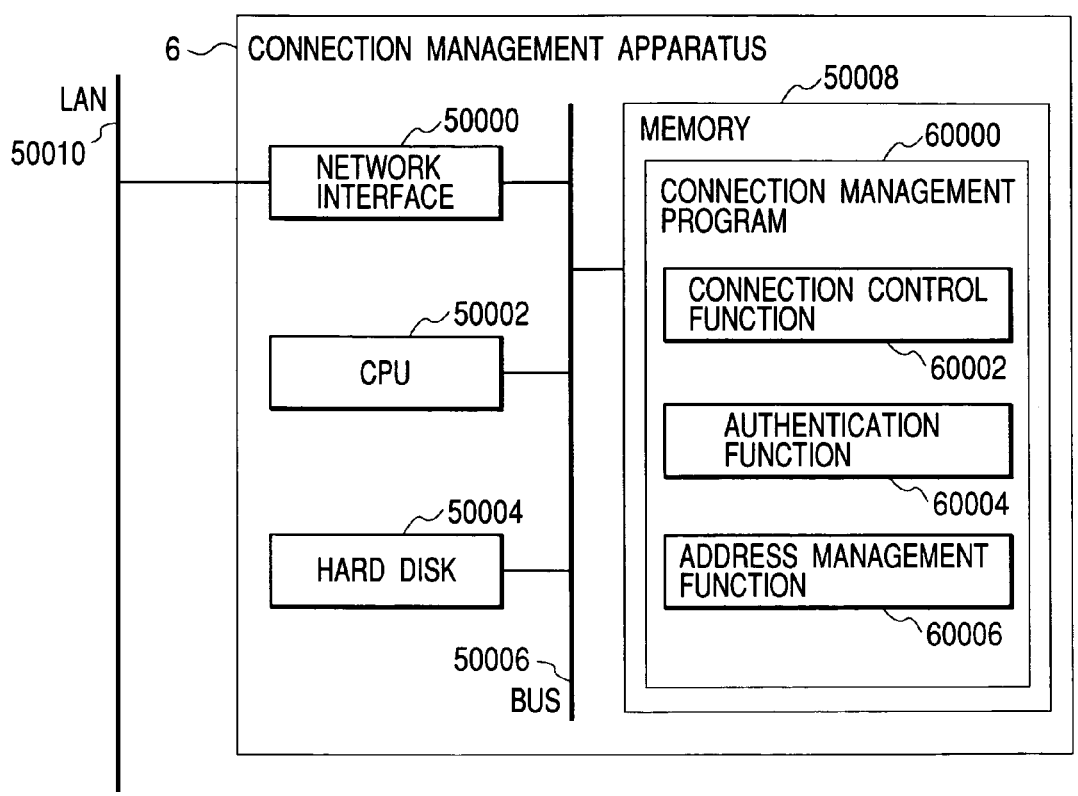
FIG. 25 is a block diagram for schematically representing a hardware construction of the connection management apparatus.

Next, a hardware structure of a connection control system 5 is indicated by way of FIG. 24. As shown in FIG. 1, the connection control system 5 is constituted by the connection control apparatus 52, the authentication apparatus 54, and the address management apparatus 56. These apparatus are equipped with the network interfaces 50000 respectively, and are communicated to each other by way of a LAN 50010. In addition, each of these apparatus is provided with a CPU 50002, a hard disk 50004, and a memory 50008. These structural elements transmit/receive data with each other via a bus 50006 provided in the apparatus. A program capable of realizing the functions of the respective apparatus has been stored in the memory 50008 of each of the apparatus. A connection control program 52000 is operated on the memory 50008 of the connection control apparatus 52, and this program is equipped with the connection control function 52002. Similarly, an authentication program 54000 equipped with the authentication function 54002 is operated on the memory 50008 of the authentication apparatus 54, whereas an address management program 56000 equipped with the address management function 56002 is operated on the memory 50008 of the address management apparatus 56. As the realizing mode of these apparatus, individual computers may be allocated to the respective apparatus, and alternatively, a plurality of computers may be handled as a single computer similar to a blade server. Alternatively, all of these functions may be mounted on a single computer. FIG. 25 indicates such an example that the connection control apparatus 6 is mounted as single hardware. Similar to the respective apparatus of FIG. 24, the connection management apparatus 6 is provided with a network interface 50000, and is communicated with an external unit, and a gateway by way of a LAN 50010. The connection management apparatus 6 is further provided with a CPU 50002, a hard disk 50004, and a memory 50008. These structural elements transmit/receive data with each other by a bus 50006 provided in each of the apparatus. A connection management program 60000 equipped with the functions of the connection management apparatus 6 is operated on the memory 50008. The connection management program 60000 is provided with a connection control function 60002, an authentication function 60004, and an address management function 60006. These functional blocks own the same functions as the connection control apparatus 52, the authentication apparatus 54, and the address management apparatus 56. A process sequence of this connection control program 60000 is similar to that shown in FIG. 10 and FIG. 11.

Figure 28:
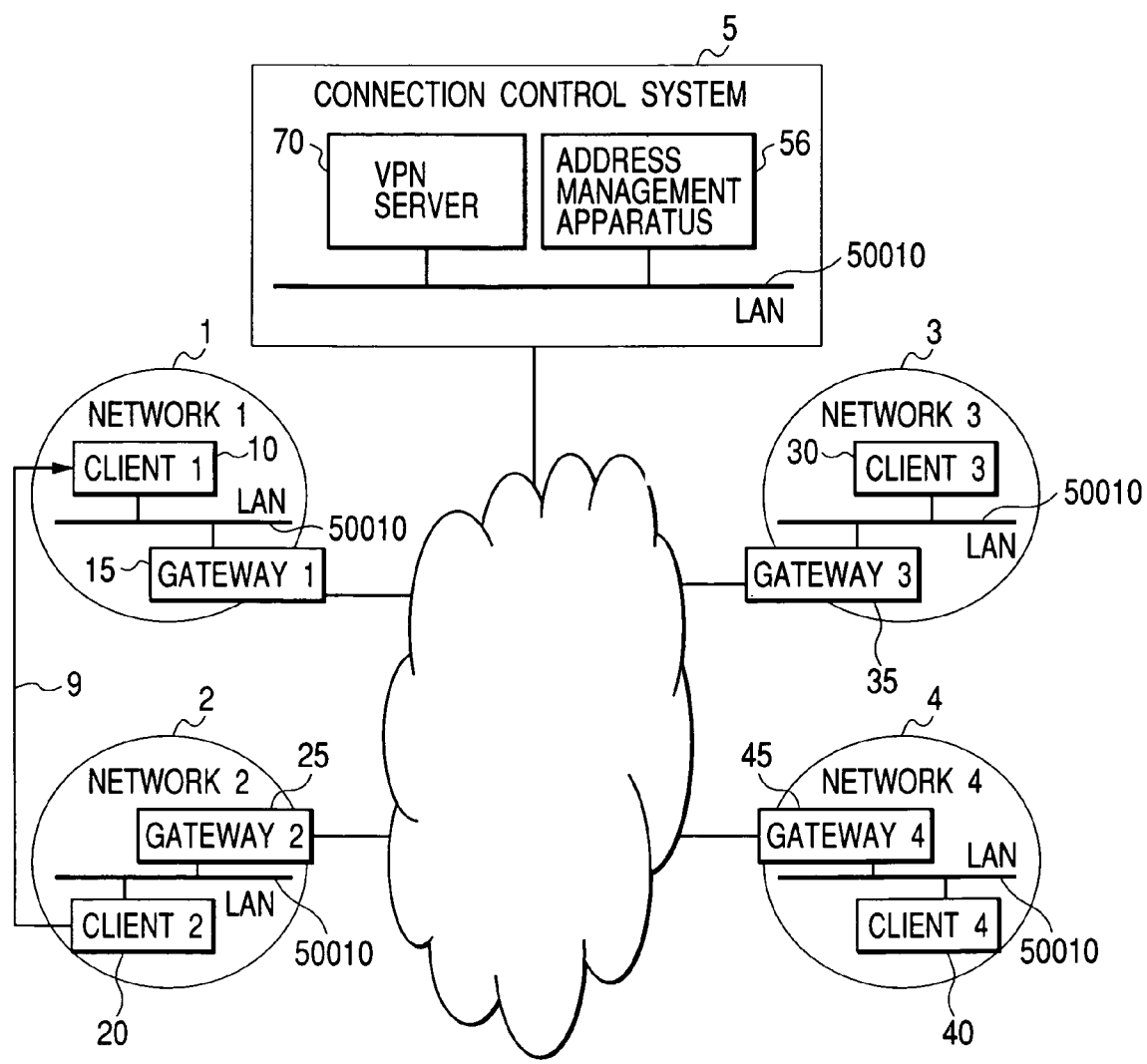
FIG. 28 is a diagram for illustratively representing an example of realizing a connection control system by way of a VPN server.

Next, a description is made of several application examples. FIG. 28 shows an application example in which a connection control system is constituted by employing a VPN server 70. Generally speaking, the VPN server 70 corresponds to such a server. That is, while this VPN server 70 manages a connection permission as a pair of a transmission source network and a transmission destination network in a communication operation, this VPN server 70 permits/manages only such a communication from a client which owns a connection permission and the user authentication of which has been completed. This VPN server 70 may be regarded as such an apparatus equipped with both the function of the connection control apparatus 52 and the function of the authentication apparatus 54.

A condition obtained when the VPN server 70 is applied to the connection control system 5 is shown in FIG. 28. Since the VPN server 70 is operated in cooperation with the address management apparatus 56, the connection control operations shown in FIG. 10 and FIG. 11 can be carried out.

Figure 29:
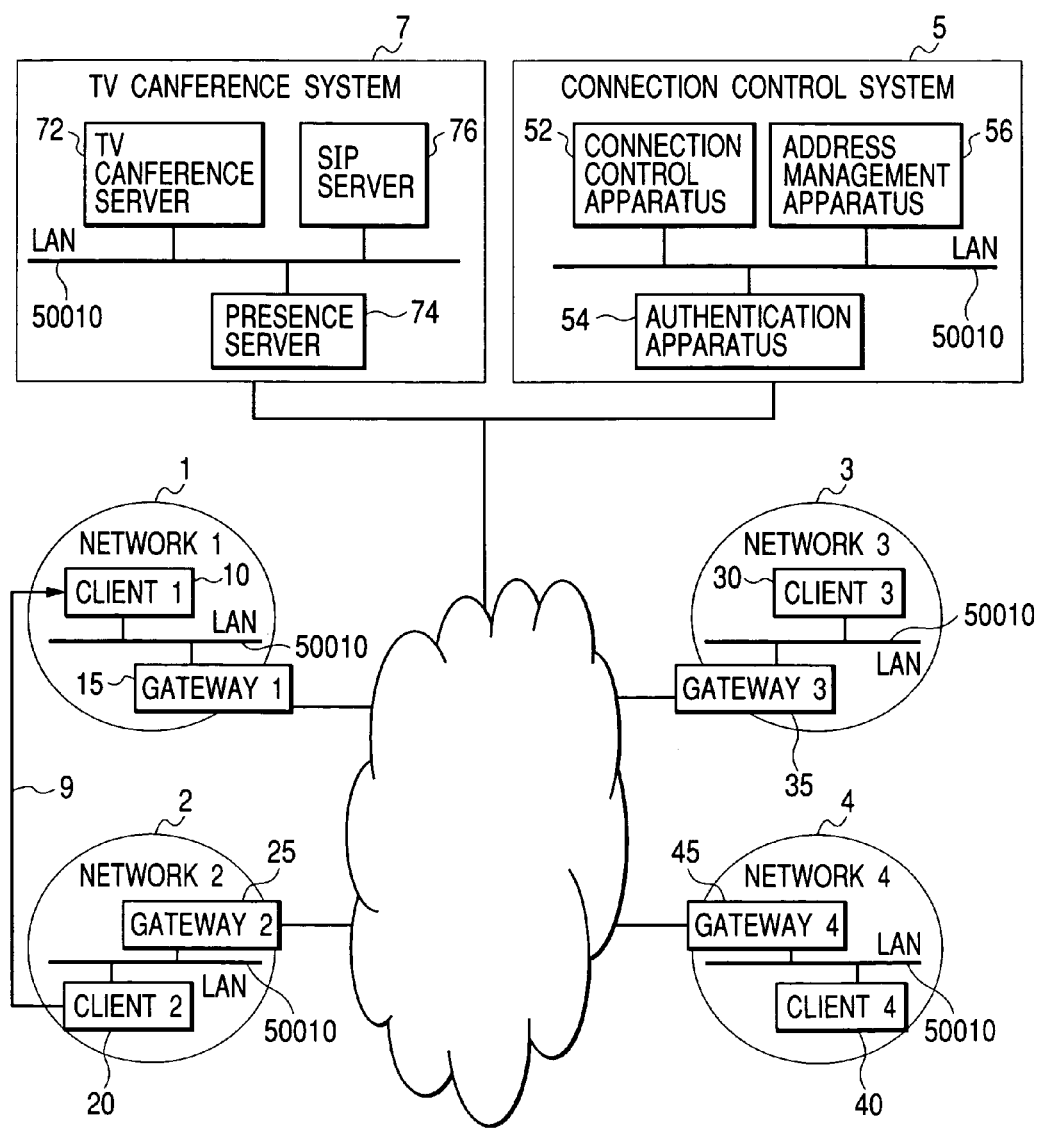
FIG. 29 is a diagram for illustratively showing a linking example established between a TV conference system and a connection control system.

FIG. 29 indicates an application example in which the connection control system 5 is operated in cooperation with a TV (television) conference system 7. The TV conference system 7 is arranged by a TV conference server 72, an SIP server 76, and a presence server 74. The SIP server 76 performs a call control by way of SIP (Session Initiation Protocol) which has been standardized in IETF. The presence server 74 manages states of TV conference participants. The TV conference server 72 interrogates the presence server 74 as to states of the participants when the conference is commenced, and acquires such information, that is to say, as to whether or not the participants presently initiate clients, and the participants presently belong to which network. At this time, there are some possibilities that a communication cannot be established from the conference server 72 to a client, depending upon a certain network to which this client presently belongs. In such a case, both the conference server 72 and the SIP server 76 may utilize the connection control system so as to secure the communication reachable characteristic to the client. Alternatively, both the TV conference system 7 and the connection control system 5 may be installed as a single system. In this alternative case, for example, the SIP server 76 may employ the function of the connection control apparatus 52.

The above-described connection control function may be realized by the below-described program. That is, in a program executable in a server which is connected via a communication network to a first terminal and a second terminal, and which is equipped with a transmission/reception unit connected to the communication network, and a CPU connected to the transmission/reception unit, the program causes the server to execute a connection control method comprising:

a step in which the transmission/reception unit accepts a connection request issued from the first terminal to the second terminal;

a step in which the CPU judges as to whether or not the connection can be established from the first terminal to the second terminal;

a step in which in the case that the connection cannot be established as a result of the judgement, the CPU generates such an address capable of connecting the first terminal to the second terminal; and a step in which the transmission/reception unit transmits data containing this address to the first terminal.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A connection management apparatus to be coupled to a first gateway belonging to a first network and connecting to a first terminal, a second gateway belonging to a second network connecting to a second terminal, and a third gateway belonging to a third network, comprising:

a transmission/reception unit connectable to said first, second and third networks; and a CPU connected to said transmission/reception unit, wherein:

when a connection request issued from said first terminal to said second terminal is received by said transmission/reception unit, said CPU judges whether or not a first connection directly between the first and second networks is permitted under a predetermined connection restriction between networks to be established from said first terminal to said second terminal;

when said first connection is not permitted to be established directly from said first network to said second network as a result of said judgment, said CPU generates an address identifying a second connection including said first gateway, said second gateway and said third gateway, which are connectable from the first terminal to said second terminal, and then said CPU transmits a data containing said generated address from said transmission/reception unit to said first terminal, and transmits an address registration request containing said generated address from said transmission/reception unit to said first gateway and said third gateway for starting the second connection from said first terminal to said second terminal via said third gateway; and when a notification notifying that said second connection has finished is received by said transmission/reception unit from said first terminal, said CPU transmits an address deletion request contained in said address registration request from said transmission/reception unit to said first gateway and said third gateway.

2. A connection management apparatus as claimed in claim 1, further comprising a memory connected to said CPU, wherein
said memory stores a database for judging as to whether or not the first connection from the first terminal to the second terminal can be established; and
said CPU executes said judgment by employing said database.

3. A connection management apparatus as claimed in claim 2, wherein when said first connection is permitted to be established as judged, said CPU further reads out a program from said memory and executes the program to authenticate said first terminal and generates said address after authentication of said first terminal is succeeded.

4. A connection management apparatus as claimed in claim 3, wherein prior to establishing the second connection, the authentication apparatus executes authentication of said first terminal and ensures that said first terminal is authorized to connect to the first, second and third gateways constituting said second connection.

5. A connection management apparatus as claimed in claim 1, wherein
when said first connection is not permitted to be established as judged, said CPU retrieves the second communication path from said first terminal to said second terminal; and
when the second communication path is available and retrieved accordingly, said CPU generates said address.

6. A connection management apparatus as claimed in claim 2, wherein when said first connection is not permitted to be established as judged, said CPU notifies such a fact to said first terminal, and said CPU generates said address after a request has been issued from said first terminal.

7. A connection management apparatus as claimed in claim 5, wherein when said first connection is permitted to be established as judged, said CPU reads out a program from a memory connected to said CPU and executes the program to authenticate said first terminal, and generates said address after authentication of said first terminal is succeeded.

8. A connection management apparatus as claimed in claim 1, wherein when said first connection is not permitted to be established as judged, said CPU notifies such a fact to said first terminal, and the CPU generates said address after a request has been issued from said first terminal.

9. A connection management apparatus as claimed in claim 1, wherein the predetermined connection restriction between networks is applicable to all terminals belonging to the networks.

10. A connection control system to be coupled to a first gateway belonging to a first network and connecting to a first terminal, a second gateway belonging to a second network and connecting to a second terminal, and a third gateway belonging to a third network, comprising:
a connection control apparatus including a first transmission/reception unit connected to said first, second and third networks and a first processor connected to said first transmission/reception unit; and
an address generation apparatus including a second transmission/reception unit connected to said first, second and third networks and a second processor connected to said second transmission/reception unit, wherein
when a connection request issued from said first terminal to said second terminal is received by said first transmission/reception unit, said first processor judges whether or not a first connection directly between the first and second networks is permitted under a predetermined connection restriction between networks to be established from said first terminal to said second terminal, and
when said first connection is not permitted to be established directly from said first network to said second network as a result of said judgment, said first transmission/reception unit transmits a generation request for generating an address required for establishing a second connection by which said first terminal is permitted to be connected to said second terminal via said third gateway to said address generation apparatus, and
said second transmission/reception unit receives said generation request for generating said address, said second processor generates an address identifying said first gateway, said second gateway and said third gateway via which a second connection between said first terminal and said second terminal is permitted to be established, and said second transmission/reception unit transmits a data containing said generated address to said first terminal and then transmits an address registration request containing said generated address to said first gateway and said third gateway for starting the second connection; and
when an notification notifying that said second connection has finished is received by a transmission/reception unit of said address generation apparatus from said first terminal, said second transmission/receptions unit transmits an address deletion request contained in said address registration request to said first gateway and said third gateway.

11. A connection control system as claimed in claim 10, wherein
when said first connection is not permitted to be established as judged by said first processor, said first processor further retrieves an another communication path of said second connection from said first terminal to said second terminal; and
when said another communication path of said second connection is available and retrieved accordingly, said first transmission/reception unit transmits said generation request for generating said address required for establishing said second connection by which said first terminal can be connected to said second terminal to said address generation apparatus.

12. A connection control system as claim in claim 11, wherein
when said first connection is not permitted to be established as judged by said first processor, said connection control apparatus notifies such a fact to said first terminal, and said address generation apparatus generates said address connectable to said second terminal after a request has been issued from said first terminal.

13. A connection control system as claimed in claim 11, further comprising an authentication apparatus which includes a third processor, a memory and a third transmission/reception unit connected to said first, second and third networks, and said third processor and said memory being connected to said third transmission/reception unit and to each other,
wherein when said first connection is permitted to be established as judged in said connection control apparatus, said third processor executes the authentication of said first terminal and then said address generation apparatus generates said address connectable to said second terminal after authentication of said first terminal is succeeded.

14. A connection control system as claimed in claim 10, wherein when said first connection is not permitted to be established as judged by said first processor, said connection control apparatus notifies such a fact to said first terminal; and furthermore, said address generation apparatus generates said address connectable to said second terminal after a request has been issued from said first terminal.

15. A connection control system as claimed in claim 14, further comprising an authentication apparatus which includes a third transmission/reception unit connected to said first, second and third networks, a third processor and a memory, and said third processor and said memory are connected to said third transmission/reception unit and to each other, wherein when said first connection is permitted to be established as judged in said connection control apparatus, said third processor executes the authentication of said first terminal and then said address generation apparatus generates said address connectable to said second terminal after authentication of said first terminal is succeeded.

16. A connection control system as claimed in claim 10, further comprising an authentication apparatus which includes a third transmission/reception unit connected to said first, second and third networks a third processor and a memory, and said third processor and said memory are connected to said third transmission/reception unit and to each other, wherein when said first connection is permitted to be established as judged in said connection control apparatus, said third processor executes the authentication of said first terminal and then said address generation apparatus generates said address connectable to said second terminal after authentication of said first terminal is succeeded.

17. A connection control system as claimed in claim 16, wherein prior to establishing the second connection, said third processor of the authentication apparatus executes authentication of said first terminal and ensures that said first terminal is authorized to connect to the first, second and third gateways constituting said second connection.

18. A connection control system as claimed in claim 10, wherein the predetermined connection restriction between networks is applicable to all terminals belonging to the networks.

* * * * *